United States Patent
Carlin et al.

(10) Patent No.: US 7,062,722 B1
(45) Date of Patent: Jun. 13, 2006

(54) NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF PROMOTION AND PROCUREMENT

(76) Inventors: Bruce Carlin, 957 Tingley La., San Diego, CA (US) 92106-2969; Satoshi Asami, 2041 Bowers Ave., Santa Clara, CA (US) 95051-1827; Arthur Porras, 4320 Valle Vista, San Diego, CA (US) 92103-1255; Sandra Porras, 4320 Valle Vista, San Diego, CA (US) 92103-1255

( * ) Notice: Subject to any disclaimer, the term of this patent is extended or adjusted under 35 U.S.C. 154(b) by 984 days.

(21) Appl. No.: 09/643,507

(22) Filed: Aug. 22, 2000

(51) Int. Cl.
*G06F 17/00* (2006.01)

(52) U.S. Cl. ................ 715/850; 715/781; 715/782; 715/835; 715/836; 715/848; 715/849; 715/851

(58) Field of Classification Search ........ 715/848–852, 715/781, 782, 835, 836, 757, 789, 788, 771, 715/837, 744–747, 740; 345/781, 782, 835, 345/836, 848, 849, 850–852, 757, 749, 748, 345/771, 837, 744–747, 740
See application file for complete search history.

(56) References Cited

U.S. PATENT DOCUMENTS 5,808,613 A * 9/1998 Marrin et al. ............... 345/850
6,122,391 A * 9/2000 Ringland et al. ........... 382/100

(Continued)

*Primary Examiner*—Kristine Kincaid
*Assistant Examiner*—Peng Ke
(74) *Attorney, Agent, or Firm*—Fuess & Davidenas

(57) ABSTRACT

A design professional such as an interior designer running a browser program at a client computer (i) optionally causes a digital image of a room, or a room model, or room images to be transmitted across the world wide web to a graphics server computer, and (ii) interactively selects furnishings from this server computer, so as to (iii) receive and display to his or her client a high-fidelity high-quality virtual-reality perspective-view image of furnishings displayed in, most commonly, an actual room of a client's home. Opticians may, for example, (i) upload one or more images of a client's head, and (ii) select eyeglass frames and components, to (iii) display to a prospective customer eyeglasses upon the customer's own head. The realistic images, optionally provided to bona fide design professionals for free, promote the sale to the client of goods which are normally obtained through the graphics service provider, profiting both the service provider and the design professional. Models of existing objects are built as necessary from object views. Full custom objects, including furniture and eyeglasses not yet built, are readily presented in realistic virtual image.

Also, a method of interactive advertising permits a prospective customer of a product, such as a vehicle, to view a virtual image of the selected product located within a customer-selected virtual scene, such as the prospective customer's own home driveway. Imaging for all purposes is supported by comprehensive and complete 2D to 3D image translation with precise object placement, scaling, angular rotation, coloration, shading and lighting so as to deliver flattering perspective images that, by selective lighting, arguably look better than actual photographs of real world objects within the real world.

51 Claims, 8 Drawing Sheets

U.S. PATENT DOCUMENTS

| | | | |
|---|---|---|---|
| 6,231,188 B1 * | 5/2001 | Gao et al. | 351/227 |
| 6,323,911 B1 * | 11/2001 | Schein et al. | 348/552 |
| 6,329,994 B1 * | 12/2001 | Gever et al. | 345/473 |
| 6,331,858 B1 * | 12/2001 | Fisher | 345/582 |
| 6,414,679 B1 * | 7/2002 | Miodonski et al. | 345/420 |
| 6,459,435 B1 * | 10/2002 | Eichel | 345/588 |
| 6,533,418 B1 * | 3/2003 | Izumitani et al. | 351/204 |
| 6,572,377 B1 * | 6/2003 | Masters | 434/72 |
| 6,654,033 B1 * | 11/2003 | Miller et al. | 345/763 |
| 6,727,925 B1 * | 4/2004 | Bourdelais | 345/852 |

* cited by examiner

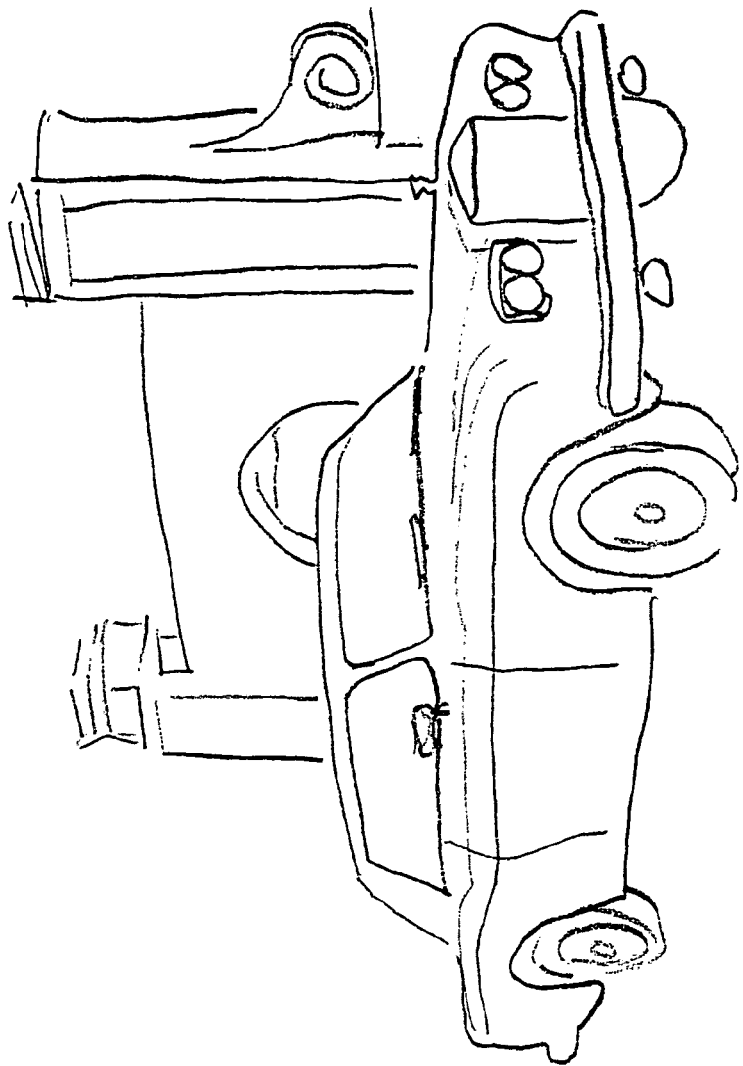

NETWORK-LINKED INTERACTIVE THREE-DIMENSIONAL COMPOSITION AND DISPLAY OF SALEABLE OBJECTS IN SITU IN VIEWER-SELECTED SCENES FOR PURPOSES OF PROMOTION AND PROCUREMENT

BACKGROUND OF THE INVENTION

1. Field of the Invention

The present invention generally concerns the computerized composition and display of perspective images of real or virtual three-dimensional objects, most typically objects for sale, located in, surrounding or in front of, real or virtual three-dimensional scenes where both objects and scenes are not fanciful, but are or could be existing within the real world, for the purpose of advertising or selling the depicted objects. The composition and display may be, by way of example, (i) the selection and placement of furnishings within interior rooms, or (ii) the selection and display of eyeglasses upon the head of a prospective purchaser, for purposes of advertising or selling either room furnishings, or eyeglasses, as the case may be, by depicting these objects in three-dimensional scenes unique to the viewer, such as in the viewer's own home or on the viewer's own head.

The present invention particularly concerns the communications-network-linked software-program-driven computerized selection, composition and imaging of furniture and furnishings, including of virtual objects that are not yet fabricated, in perspective view within real or virtual rooms responsively to interaction with professional interior designers and decorators, the man-machine interaction being so that designs of, inter alia, furnished rooms may be both interactively developed across a digital communications network and, ultimately, displayed to a prospective consumer-purchaser of the room furnishings and/or the room.

The present invention also particularly concerns communications-network-linked software-program-driven computerized selection, composition and display—in response to interaction with professional opticians and optometrists—of eyeglasses, including virtual eyeglasses not yet fabricated, upon the head of a prospective consumer purchaser of the eyeglasses; the display being to the end of advertising eyeglasses to, promoting the efficient selection of eyeglasses by, and/or selling eyeglasses to, prospective eyeglass purchasers.

2. Background

2.1 General Background

The present invention will be seen to have both (i) business and (ii) technical aspects. Technically, the present invention will be seen to broadly concern a software-based system for both (i) interactively producing, and (ii) rendering, across a digital communications network, photo-realistic composite images of interactively customized products in such surroundings as are customary to and specified by the viewer of the image, different viewers desiring and appreciating different surroundings. Business-wise, this rendering, typically conducted as a network service at no cost to enrolled business professionals, is for the purpose of promoting and selling such products. These customary surroundings are referred to herein as "background scenes". The selected and placed product images will be seen to include, by way of example, (i) images of interior furnishings, rendered within background scenes of interior spaces, and (ii) images of eyeglass frames, rendered within a background scene consisting of the head of a prospective purchaser.

2.2 Previous Patents Directed to Interior or Exterior Design

U.S. Pat. No. 4,318,121 to Taite, et. al., for INTERIOR DECOR COMPOSITION AND DISPLAY SYSTEMS concerns display systems are of particular utility in assisting interior decorators and homemakers in selecting appropriate color and fabric combinations. In particular, the subject display systems provide a luminous image of an interior decor including components, such as furniture, drapes and carpets. The system picks up colors from different samples, each of which typically has an area smaller than the area of any displayed component. These picked-up colors are selectively filled in the displayed components when the image is displayed. Color arrangements are changed by substituting other picked-up colors in the display of particular components.

U.S. Pat. No. 4,931,929 to Sherman for DESIGN COMPONENT SELECTION COMPUTER WITH SPECIFICATION OF PRODUCT CHARACTERISTICS AND OF COLOR BY MACHINE READABLE DEVICE concerns a process for identification, description and display of design components, such as interior decoration products, selected by describing desired component characteristics to a digital computer. An image database is provided, preferably in the form of an addressable optical videodisk, each frame of which portrays an individual design component, and the images are displayed by operation of a computer-controlled archive system such as a random-access optical videodisk player. A characteristics database is provided to characterize each portrayed design component by a variety of product categories including at least color, price, manufacturer and image database address. The process obtains one or more desired component characteristics, examines the characteristics database to identify design components meeting the desired product characteristics, and displays the identified component images together with a complete record of characteristics for each product. The desired color characteristic can be obtained by selection from a text dictionary of color identification terms, by machine inspection of a machine-readable color comparison sample, or by optical spectrum analysis of a pre-existing product sample.

U.S. Pat. No. 5,255,352 to Falk for MAPPING OF TWO-DIMENSIONAL SURFACE DETAIL ON THREE-DIMENSIONAL SURFACES concerns a system and method for providing surface detail to mathematically-defined three-dimensional surfaces which preserves the specific dimensional integrity of the surface detail image being mapped in order to provide dimensionally correct surface detail. This is accomplished by performing the intermediate step of mapping the surface detail image to a two-dimensional flattened pattern piece representation of the surface and thereafter mapping this representation to the three-dimensional surface. The system and method of the present invention may be used as one function of a greater three-dimensional computer aided design system for any industry which utilizes flat sheets of material formed or assembled into a finished product, including textiles, apparel, footwear, upholstered furnishings, automotive or interior design.

U.S. Pat. No. 5,601,431 to Howard for an INTERIOR DESIGN SYSTEM AND METHOD concerns an interior design system comprising a display assembly having three flexible transparent overlays, a plain background sheet hinged to corresponding edges of the overlays, and a template sheet hinged to a free edge of the background sheet and having "scale" background and foreground grid sections. All this is for assisting in laying out interior room decorator's designs with a comprehensive catalog of design elements printed with scale designs of perspective furniture and accessory designs, and architectural elements for creating the room space to be decorated. The catalog pages have rows of printed scale designs covered with transparent plastic, with overlying, selectively removable and replaceable design elements. The design elements have designs that are printed to the same scale on carrier sheets of flexible "static-cling" material. These carrier sheets are rectangular sections that are cut from a printed sheet the same size and shape as the backing sheet. In this manner, the catalog pages provide marked storage positions for the design elements after use.

In addition, the backing sheets are marked with descriptive labels and special coded symbols in distinctive shapes and colors for assisting in selection and coordination of interior designs, and also are imprinted with generic labels for the designs. The method constitutes the steps of (i) providing the catalog of scale images and the background and foreground grid sections, (ii) labeling and coding the images for identification, coordination and storage, (iii) selecting candidate images from the catalog and transferring them to the grid sections, (iv) applying the images in the desired positions and combinations, thereby to create a decorator's design, plus, optionally, (v) applying colors as an overlay on the completed design for a more complete rendering.

U.S. Pat. No. 5,940,806 to Danial for a METHOD AND APPARATUS FOR RECEIVING, STORING AND PROVIDING DATA CORRESPONDING TO GEOMETRICALLY DESCRIBABLE RAW MATERIALS concerns an apparatus and method employing a programmable computer for providing a list of data items corresponding to geometrically describable materials based upon a profile specified by a user. The list of data items is stored in a data base. Each data item includes geometrically descriptive terms and trading parameters identifying characteristics of an item offered for sale by an advertiser. A profile is generated by a user which includes geometrically descriptive terms and trading parameters identifying characteristics of an item sought for purchase by the user. The profile identified by the user is compared to each data item stored in the data base and data items are identified which match the profile. The data item identified are provided to the user in accordance with the user's specific delivery instructions.

U.S. Pat. No. 6,005,969 to Thomas, et. al., concerns METHODS AND SYSTEMS FOR MANIPULATION OF IMAGES OF FLOOR COVERINGS OR OTHER FABRICS that enable a highly streamlined and efficient fabric or textile sampling and design process. The sampling and design process is claimed to be particularly valuable in the design and selection of floor coverings, wall coverings and other interior design treatments. A digital library of fabric models is created, preferably including digitized full-color images associated with digital representations of positions that are located within, and which characterize, the models. Via an application implemented according to conventional software methods and running on conventional hardware having high resolution graphics-processing capabilities, a user may navigate among the set of alternative models, and may modify the positions of the selected models to test out desired combinations of characteristics—such as poms or yarn ends, or models of floor coverings—and view the results in high resolution. A method is provided for substituting colors in digital images of photographic quality, while preserving their realism particularly in the vicinity of shadows. The resulting samples or designs can be stored and transmitted over a telecommunications network or by other means to a central facility that can either generate photographic-quality images of the samples, or can directly generate actual samples of the carpet or other material of interest.

2.3 A Specific Previous Interior Design System Operative on a Private Satellite Down-Link, Phone Line Up-link Communications Network The system and method of the present invention will be seen to involve interactive communications across a digital communications network for the purpose of producing images that typically include furniture. At least one previous upholstered furniture customization system involves a real-time network-based interactive system for support of visualizing upholstered furniture prior to placing an order for the upholstered furniture.

This existing interactive system of La-Z-Boy™ Incorporated, and possibly others, is available for use by sales associates in La-Z-Boy™ furniture showrooms. The system permits prospective customers to preview La-Z-Boy furniture upholstered in La-Z-Boy offered fabrics. It requires a La-Z-Boy™ furniture item number, and a La-Z-Boy™ fabric number. The system then maps the fabric onto a static perspective view of the selected furniture item.

To the extent of depicting furniture, this previous system is similar to the system and method of the present invention. However, the system used by La-Z-Boy™ is considerably different from the system of the present invention as to each of, inter alia, (i) system interaction (rote versus sophisticated) with the targeted user (a furniture salesman versus an interior designer), (ii) how the furniture images are generated and presented (2D versus 3D, and fixedly versus being shown in context), (iii) the technical capabilities of the image generation (no provision for scaling, rotation and placement of upholstered furniture images into background scenes), and (iv) the business model supported (retail store furniture promotion vs. a professional-level interior design tool supporting furniture selection, placement and procurement as well as promotion.)

2.4 A Specific Interior Design System Operative on the Internet

The system and method of the present invention will be seen to involve communications across a digital communications network, to wit: the Internet. At least one interactive design system—evolved as a real-time network-based evolution of an older PC-based software program product—already (circa 2000) exists on the Internet. This existing system is superficially similar to the system and method of the present invention. However, the existing system is again considerably different from the system of the present invention as to each of, inter alia, (i) the targeted audience (amateurs versus professionals), (ii) how the images are generated and presented (2D versus 3D), and (iii) the business model supported (furniture and software promotion vs. professional-level design assistance, furniture promotion and procurement.)

The existing interactive system is the called the cMyVision™ Free Internet design software for use in interior, exterior, home and landscape improvement. The cMyVision™ software is a product, and cMyVision™ web site a service, of Visual Applications, Inc. (VisApp), headquartered in Kansas City, Mo. (cMyVision™ is a trademark of VisApp.) VisApp is a publisher of personal visualization technology, with a web site at <http://www.visapp.com> of the year 2000.

Use of cMyVision™ Free Internet design software for interior, exterior, home and landscape improvement initially requires a digital photo of a house, normally the client's own house. Into this 2D scene a 2D object is inserted from the cMyVision library, or database. The system of the present invention will be seen to differ in that, from two or more 2D views, a 3D model of the client's 3D space, replete with dimensions, is first constructed. Then this 3D space is populated with 3D objects such as furniture. Accordingly, the cMyVision system operates to produce two-dimensional (2D) images while the system of the present invention, employing full three-dimensional (3D) models of both scenes and objects, produces full perspective scene views.

VisApp also sells a product called VisualPhile™ Personal Visualization Software, touted to support professional interior remodeling and design.

VisualPhile™ is personal computer software with the same features as cMyVision™. It runs on a personal computer without an Internet connection, as its library is included with the program. It is primarily suited to providing photo-realistic visualizations of home remodeling as opposed to decorating projects. As in cMyVision™, a certain degree of photo-realism stems from the use of photographs for both rooms and built-ins, appliances and furnishings.

However, there exist inherent limitations—arguably severe when applied to professional interior design—in both cMyVision™ and VisualPhile™ and their use of digital photographs. These previous systems (i) are not based upon 3D coordinates (as will be seen to be used in the present invention), so furniture images have to be placed and scaled visually by the user; and (ii) the furniture objects are 2D images, so they cannot be rotated to match the angle of the room photograph (as will seen to be the case in the present invention). Therefore, in both cMyVision™ and Visual-Phile™, room photos must be taken from a specified perspective, as their furniture photographs are all taken from this angle. Moreover, (iii) because the furniture images are only photographs, and not 3D models, it is not possible to map fabrics on them. This last limitation cannot be mitigated and is highly significant in professional interior design applications.

2.5 Stand Alone Personal Computer Interior Design Programs

A number of software programs are commercially available which support interior design. These programs generally run on personal computers and allow the user to design rooms, place furniture objects into rooms, change wall colors and furniture fabrics, and display the customized furniture in the decorated rooms. Custom Home 3-D Design and Decor, published by Sierra On-line, Inc., 5 in 1 Home Design by Punch! Software LLC, and 3D Home Interiors by Broderbund all support most of these design-assistance and visualization objectives. In addition, numerous commercially-available programs support architectural rendering, including computer-aided design (CAD) programs like AutoCAD, which incorporate 3-D functionality and therefore have application to interior design.

Custom Home 3-D Design and Decor includes a program called Photo Home Interiors™. This program, unlike the others, allows users to import photographs of actual rooms into the program, and then place furniture objects into the room images. The objects include 3-D furniture models, which can be rotated and scaled to fit the scene. However, the room images are not associated with a 3-D model of the room. In other words, while Photo Home Interiors™ does allow furniture objects to be shown as an overlay on top of room photographs, it lacks the capability of rendering furniture objects placed onto floor plans in photographically-derived scenes. Therefore, this program does not allow wall and floor coverings to be displayed in the proper perspective. In addition, the 3-D objects need to be visually scaled by the user to compensate for the perceived distance from the camera position. With this system, it is not possible to evaluate furniture objects of specific dimensions as to scale. For all of these reasons, is cumbersome to use on a personal computer, and would be even more so over a digital communications network.

Furthermore, the furniture objects are generic and therefore not available for purchase, no procurement features are available, the furniture and fabric database is very limited in quantity and quality. Finally, this program does not operate over a digital network.

As a result of such limitations, even this program has limited professional application. These limitations in the prior art are overcome in the present invention, which incorporates proprietary technology developed to support this highly desirable functionality.

2.6 Desirability of the Rendering of Images of Eyeglasses Upon the Head of the Actual Eyeglass Purchaser/Wearer/User New eyeglasses are difficult for consumers to evaluate, because they may not be available in the sales showroom in the proper size, color or shape. In addition, many customers, especially those who are myopic (near-sighted), can not clearly see the frames when trying them on.

It would therefore be useful to permit optical businesses to interactively customize frame designs to complement the shape of their customer's face, skin and hair color, and to permit their customers to see how such customized products look on a computer-generated image of themselves. Such renderings would desirably include lens tints and even the facial distortion imposed by the customer's actual lens design. Furthermore, profile and oblique views would permit customers to evaluate the merits of thin high refraction index materials, as well as to assess their own appearance to others while wearing the eyeglasses.

Such a system would be a promotional tool, potentially expanding the number of frame offerings by several orders of magnitude or more (being that inventory in the form of virtual digital images costs veritably nothing), and making a limitless virtual display rack available. Such a system would prospectively reduce the number of customers who walk out of an eyeglass sales store because they couldn't find a frame that they found attractive. Such a system would desirably support the sale of high-margin tints, high-index and progressive lenses, optical coatings, and a second or third pair of "fancy" glasses designed to complement fashionable clothing as the customer would be able to shop with confidence as to the appearance of these features.

Regardless of the inducements to purchase provided by such a system, the system would indisputably reduce distribution and sales costs by eliminating the need for large frame display inventories and automating the procurement process.

2.7 Existing 3D Image Capture Technology

The present invention will be seen to beneficially employ in the generation of three-dimensional (3D) images of a human head a 3D image capture technology. Such a technology is commercially available, circa 2000, from Minolta Co., Ltd. in combination with MetaCreations, Inc., in the 3D 1500 camera product. The 3D 1500 is a complete hardware/software package that combines a quality Minolta digital camera with MetaCreation's MetaFlash 3D image production technology. It allows creation of high-quality 3D models in MetaCreation's MetaStream file format, which can be transmitted quickly over the network for further manipulation.

Another example of a three-dimensional (3D) image acquisition system for deriving 3D models of the human head is the ShapeSnatcher 3D-Toolkit from Eyetronics, Inc. After calibration, data can be captured within the time needed for a single photograph or frame. The 3D model is textured, with a perfect alignment between the shape and the texture. Skin color, marks or scars are visible as they would be on a photograph.

SUMMARY OF THE INVENTION

The present invention will be seen to have both (i) business and (ii) technical aspects.

The business method of the present invention is based on a software-based computerized system for both (i) interactively selecting and, if useful, customizing both objects and object environments, ultimately (ii) rendering composite perspective images—which may be photo-realistic if desired—of the interactively-selected and customized objects in the context of such image surroundings as are customary to the individual viewer, different viewers desiring and appreciating different customary surroundings. All (i) the interactive selection and (ii) the image rendering transpires across a communications network—typically a worldwide digital communications network (the Internet)—for purposes of advertising, promoting or selling the depicted objects in situ.

The objects for which the images are generated are preferably not only products for sale, but products that are strongly beneficially best shown and appreciated in a context strongly relevant to an individual viewer, such as furniture within a person's own home, or eyeglasses upon a person's own head.

The object/product selection and image rendering service is normally furnished for low or no cost upon a digital communications network, and preferably on the Internet, to bona fide design and/or medical professionals. The services are furnished to these professionals so as to help them (i) satisfy the desire of their customers to make informed and confident product selection and purchase decisions, so (ii) promote specific merchandise by showing it in an environment with which the prospective customer is both familiar and sympathetic, and (iii) make sales.

The network provider of these services normally profits from being in the chain of commerce on such products, acting in any remunerative capacity from product advertiser to manufacturer to wholesaler to retailer. Note that, much like a modern supermarket, the imaging service provider serving as a middleman prospectively profits from both ends of the sales and distribution chain: (i) manufacturers and/or suppliers of goods pay in money, or in favorable prices for their goods, in order to have these goods interactively promoted, while (ii) the end purchasers of the goods may also use the brokering and order placement services of the imaging service provider.

Note that the object/product selection and image rendering service is preferably conducted interactively with professionals, and not with the end item product consumer. This is because the products that are most commonly and effectively promoted and sold are the opposite of commodities, and are normally any of "upscale", custom and/or expensive. The products are typically, and preferably, of a nature such that consumer discrimination and taste are involved in product selection—which is exactly why the products are most successfully shown in an environment with which the consumer is familiar, and to which the consumer is receptive.

Technically, the composite product image must be, and is, sufficiently accurate and appealing in showing the intended environment of product use so as to induce a favorable opinion of, and/or purchase decision on, the product. However, and although the presented composite prospective image is accurate and of high fidelity devoid of any glaring artifacts or incongruities, it need not be and typically is not photographically harsh, but can be, and generally is, somewhat romanticized and flattering, as through a veil, or under flattering lighting. This is not difficult to accomplish—once it is first recognized that it should be done, and that reality can be brutal. The system and method of the present invention is directed to simultaneously giving (i) a realistic image with an image background familiar to the consumer, and (ii) a pleasingly flattering image. The realism of the image may be further enhanced through the use of a system for measuring actual lighting illumination and shadows in photographically-derived background scenes. This will enable the rendered image to project similar lighting and shadows on the virtual objects.

The interior design professional can aid in this process by, for example, subduing lighting in a less appealing portion of a room while dramatically highlighting proposed new furniture and decor. The medical professional can aid in the process by, for example, improving the color tone of the subject, or the angle of view, or the color temperature of the lighting.

1. Image Compositing and Rendering, Including of Virtual Objects Interactively Over a Communications Net The technical method of the present invention is directed to the compositing of precisely-placed, rotated three dimensional ("3D") objects of known size into photographically- or virtually-derived background scenes. To achieve this objective, a specialized rendering and compositing methodology was developed. In the case of photographically-derived background scenes, two or more photographs of the desired background scene, taken from different angles, are obtained. The background scene may be, for example, an interior room, or an exterior space, or even a human head.

Portions of the scene that are desirably preserved in an eventual scene rendering are selected and then removed or "cutout" from the scene using standard image editing software. Then, a 3-D model of the altered background scene is created from the multiple images using commercially available software. This involves identifying common points in each of the photographs, and the distance between two points. These positions allow the precise camera location for each image to be calculated, lens distortion to be reduced, and scale and an X-Y-Z coordinate system to be established. For example, for a scene of an interior room geometric primitives are overlaid onto each wall, floor and ceiling surface, including soffits and recesses.

Next, scene objects—like furnishings such as chairs, or awnings, or eyeglasses—that are suitably incorporated in the respective scenes are selected from stock catalogs of these objects by a designer/selector. For both photographically-derived and virtually-derived background scenes, these objects—for example furnishing objects like sofas—are then placed into the 3D model depicting the background scene. All objects are placed and oriented where and as desired in the scene, and all desired surface coloration, textures, shadings, etc. are applied.

Finally, a composite rendering is produced using proprietary software. The rendering projects the background scene and all objects therein in their proper or desired position, replete with lighting effects and shadows. Cutout objects are also included for photographically-derived scenes, as well as the background scene of one of the multiple images.

As previously explained, the synthesized scene can potentially be, if desired, so realistic that it cannot be distinguished from reality save by a trained forensic "photo" analyst. However, the normal mode of the composite image rendering of the present invention is to make a geometrically spatially accurate perspective image, but not one so detailed and isotopically brightly lit so as to be suggestive of a picture of a laboratory, or of a criminal mugshot. Modern graphic imaging techniques readily permit making images less harsh and more subdued, and such techniques are used in the system of the present invention to good effect in accordance that no prospective purchaser of luxury goods should be too harshly confronted with the (visual) limitations of his or her purchase, or, worse yet, of his or her home, or, still worse yet, of himself or herself.

In summary, a system is presented that allows customized virtual objects of known size to be interactively manipulated and placed into precise locations of photographically or virtually-derived scenes at the proper scale, over a digital network. Such "in context" interactive product displays are useful for evaluating visually attractive design concepts, and for product promotion and procurement. For example, existing and to-be-constructed rooms in both residential and commercial buildings, such as might be designed by professional interior designers, are proper subjects for the display system of the present invention. For example, the showing of virtual images of eyeglass frames upon the head of a prospective purchaser of eyeglasses is a proper subject for the display system of the present invention.

2. A Method of Visually Presenting an Object Suitably Existing within the Real World within a Scene Suitably Existing within the Real World Therefore, in one of its aspects the present invention is embodied in a method of statically visually presenting an object suitably existing within the real world within a scene suitably existing within the real world.

The method combines both (i) a selected 2D image representing an associated real-world scene in which the suitably real-world object can exist, and (ii) a selected name, or, preferably, a 2D icon representing the suitably-real-world object, the 2D icon appropriately sized to, and selectively located and aligned within, the 2D representation of the selected real-world scene, with (iii) a (generated) 3D model of the represented selected real-world scene, (iv) a 3D model of the iconically represented suitably-real-world object, and (v) object-based rules as to how the suitably-real-world object exists within the real-world scene, in order to generate (vi) a perspective view of the suitably-real-world object properly located and oriented within the real-world scene.

Thus selection of each of an icon, a 2D image of a real-world scene, and an icon location within the selected scene image, permits combining a 3D model of the real-world scene with yet another 3D model of the suitably-real-world object represented by the selected icon so as to generate a static perspective view of the selected suitably-real-world object located within the selected real-world scene.

More simply put, image selection(s) transpiring entirely in 2D supports generation of a (static) perspective view showing a 3D object within a 3D scene. Furthermore, the present invention allows this to happen with photographically-derived, as well as virtually-derived, scenes.

The method is preferably exercised to the purpose that a prospective purchaser of the real-world object may be rendered a perspective view of the object within a real-world scene in which real-world scene the object can actually exist. Still more preferably, the rendered perspective view may be of (i) furniture, and furnishings, within a room or of (ii) eyeglasses, including both frame and lens elements, upon a human head.

In the case of a room image, the combining is then of (i) a selected 2D image representing a room, and (ii) a selected 2D icon representing a room furnishing, with (iii) a 3D model of the room, (iv) a 3D model of the furnishing, and (v) object-based rules that the furnishing is upon a floor or a wall of the room, in order to generate (vi) a perspective view of the room furnishing properly located and oriented within the room. By exercise of this method a prospective purchaser of the real-world room furnishing may be rendered a perspective view of a suitably-real-world room furnishing properly located and oriented within a real-world room.

The suitably-real-world room furnishing rendered in perspective view may already exist in the world, and can thus be ordered by the prospective purchaser. However, the depicted furnishing may not yet exist in the world, existing only in virtual reality, and must therefore be built if and when ordered by the prospective purchaser.

In the case of the rendering of an image of eyeglasses, the combining is of (i) a particular 2D image representing a human head, and (iii) selected eyeglasses, with (v) a 3D model of the human head, (vi) a 3D model of the eyeglasses, and (vii) object-based rules (to the effect that temple pieces of the eyeglasses slip over ears of the human head that is the subject of the 3D model while each lens of the eyeglasses is properly located in front of an eye of the human head), in order to generate (viii) a perspective, front or side view of the eyeglasses properly located and oriented upon and fitted to the human head.

Note that the eyeglasses, unlike the furniture, are not normally represented by an icon. Moreover, the eyeglasses, or more exactingly some eyeglass icon, is not positioned upon the human head. There may be a picture of each of many eyeglass frames, and the consumer may choose one to be illustrated in place upon his or her own head. However, the positioning of the eyeglasses upon the head is not by act of moving some eyeglass icon into a head image view, but by action of a model. More generally, it must be understood that the following claims of the present invention set forth the general steps of the invention for the interactive selection, and generation, of most images, including preferred step-by-step procedures for realizing preferred images of furnished rooms, or of eyeglasses fitted to the head. It is, however, possible to vary from the detail steps of some, or of all, claims without departing from the spirit of the present invention. Such is the case where (i) an icon, such as of furniture, moved into a 2D scene, such as of a room, to make a perspective image in which the furniture exhibits proper 3D placement, is alternatively equivalently realized by (ii) a selected name, such as of eyeglass frames is combined with a 3D model of eyeglass placement upon the head so as to make a perspective image in which the eyeglasses exhibit proper 3D placement. A practitioner of the imaging arts will recognize the equivalence of these processes, mutatis mutandis.

By this imaging a prospective purchaser of the real-world eyeglasses may be rendered a perspective view of the eyeglasses properly located and oriented upon, and fitted to, the purchaser's own human head. As before, the suitably-real-world eyeglasses rendered in perspective view may already exist in the world, and can be immediately shipped to a prospective purchaser. However, it is also possible that the frames of the suitably-real-world eyeglasses rendered in perspective view do not yet exist in the world, and must be custom built when ordered by the prospective purchaser.

3. An Interactive Method of Promoting and Selling Real-World Objects

In another of its aspects the present invention is embodied in a method of doing business: an interactive method of promoting and selling real-world objects.

A principle variant of the preferred method commences by originating at a server upon a digital communications network (1) a first plurality of 2D images depicting real-world scenes, (2) a second plurality of 2D images depicting real-world objects, (3) a third plurality of icons corresponding to the second plurality of images depicting real-world objects, (4) a fourth plurality of 3D models corresponding to the scenes that are depicted within first plurality of 2D images of real-world scenes, (5) a fifth plurality of 3D models corresponding to the objects that are depicted within second plurality of 2D images of real-world objects, and (6) a sixth plurality of object-based rules.

Selected members of each of the (1) first plurality of 2D images of real-world scenes, the (2) second plurality of 2D images of real-world objects, and the (3) third plurality of icons corresponding to the second plurality of images of real-world objects are first-communicated from the server upon a digital communications network to a client.

The client selects a (1a) selected real-world 2D scene image from among the (1) first plurality of images, and a (3a) selected icon from among the (3) third plurality of icons which (3a) selected icon does correspond to a (2a) selected real-world object image from among the (2) second plurality of real-world object images.

The (3a) selected icon within the (1a) selected real-world 2D scene image is sized and placed at the client's computer by operation of a computer program.

This sized and placed (3a) selected icon within the (1a) selected real-world 2D scene image is second-communicated from the client upon the digital communications network to the server.

The server selects under program control from among the (4) fourth plurality of 3D models a (4a) 3D model of the real-world scene corresponding to the (1a) selected real-world 2D scene image, and from the (5) fifth plurality of 3D models a (5a) 3D model of the real-world object.

The server then generates from the (4a) 3D model of the real-world scene, the (5a) 3D model of the real-world object and the (6) plurality of object-based rules, a (7) static perspective view of a (7a) 3D real-world object corresponding to the (3a) selected icon properly located and oriented within a (7b) 3D real-world scene corresponding to the (1a) selected real-world 2D scene image.

Next, the server third-communicates this generated (7) static perspective view upon the digital communications network to the client. By and from this third-communicated (7) static perspective view, the (7a) 3D real-world object properly located and oriented within the (7b) 3D real-world scene may be observed at the client.

The client fourth-communicates upon the digital communications network to the server a sales order, lodging with the server an order to physically provide a real specimen of the (7a) 3D real-world object. Obtaining the sales order for the (7a) 3D real-world object is thus promoted by showing the (7) static perspective view at the client, which static perspective view contained the (7a) 3D real-world object properly located and oriented within the (7b) 3D real-world scene.

In its preferred application, this interactive method of the present invention is exercised for selling real-world objects.

For example, room furnishings and furniture may be imaged and advertised and/or sold. In this application the server originates (1) a first plurality of 2D images depicting rooms, (2) a second plurality of 2D images depicting furnishings, (3) a third plurality of icons corresponding to the second plurality of furnishing images, (4) a fourth plurality of 3D models corresponding to the rooms that are depicted within first plurality of 2D room images, (5) a fifth plurality of 3D models corresponding to the furnishings that are depicted within second plurality of 2D furnishing images, and (6) a sixth plurality of rules regarding how furnishings fit within rooms. In this application the server first-communicates upon the digital communications network to the client selected members of each of the (1) first plurality of 2D room images, the (2) second plurality of 2D furnishing images, and the (3) third plurality of furnishings icons.

In this application the client selects a (1a) selected real-world 2D room image from among the (1) first plurality of room images, and a (3a) selected furnishing icon from among the (3) third plurality of furnishing icons, which (3a) selected furnishing icon does correspond to a (2a) selected furnishing image from among the (2) second plurality of furnishing images. The (3a) selected furnishing icon within the (1a) selected 2D room image is sized and placed at the client.

The client second communicates to the server upon the digital communications network the sized and placed (3a) selected furnishing icon within the (1a) selected 2D room image. The server selects from among the (4) fourth plurality of 3D models a (4a) 3D model of the room corresponding to the (1a) selected 2D room image, and from the (5) fifth plurality of 3D models a (5a) 3D model of the furnishing corresponding to the (3a) selected furnishing icon, and generates from the (4a) 3D room model, the (5a) 3D furnishing model and the (6) plurality of furnishing rules, is of a (7) static perspective view of a (7a) 3D furnishing corresponding to the (3a) selected furnishing icon properly located and oriented within a (7b) 3D room corresponding to the (1a) selected 2D room image.

Further in this application, the server third-communicates upon the digital communications network to the client the generated (7) static perspective view, and from this third-communicated (7) static perspective view the (7a) 3D furnishing properly located and oriented within the (7b) 3D room may be observed at the client.

Finally in this application, the client fourth-communicates the sales order to the server upon the digital communications network, the sales order directing physically provision of a real specimen of the (7a) 3D furnishing. Thus a sales order for the (7a) 3D furnishing has been promoted by the (7) static perspective view showing at the client the (7a) 3D furnishing properly located and oriented within the (7b) 3D room.

Typically at least one of the server's first, second and third pluralities of images is proprietary, and more typically all these first, second and third pluralities of images are proprietary.

The originating server may further offer (8) a set of available lighting effects, thus making that the first communicating from the server upon a digital communications network to the client is further of the (8) set of available lighting effects, the selecting at the client is further of a (8a) selected lighting effect from among the (8) set of lighting effects, the second communicating from the client upon the digital communications network to the server is further of the (8a) selected lighting effect, the generating at the server is further of the (7) static perspective view as illuminated by the (8a) selected lighting effect, and the third communicating from the server upon the digital communications network to the client is of the generated (7) static perspective view as illuminated by the (8a) selected lighting effect.

Likewise, the originating server may further offer of (8) a set of available textures and colors. The first communicating from the server upon a digital communications network to the client is then further of the (8) set of available textures and colors, the selecting at the client is further of a (8a) selected textures and colors from among the (8) set of textures and colors, the second communicating from the client upon the digital communications network to the server is further of the (8a) selected textures and colors, the generating at the server is further of the (7) static perspective view as textured and colored by the (8a) selected textures and colors, and the third communicating from the server upon the digital communications network to the client is of the generated (7) static perspective view as textured and colored by the (8a) selected textures and colors.

Most preferably in exercise of the interactive method for selling furnishings, the selecting, including of lighting effects and colors and textures, is performed by an interior designer at the client.

Strongly preferably in exercise of the furnishings sales method the generating produces a 3D virtual image of the room where all textures are scaled and oriented to the three-dimensional objects in which the textures appear.

This interactive method in accordance with the present invention for selling furnishings may be still further expanded in that, between the third communicating and the fourth communicating, the interior designer at the client may fifth-communicate upon the digital communications network a request for a real physical sample of something in the generated and displayed 3D image of the room with furnishings. This requested sample is normally physically providing to the interior designer to help promote the sale.

The fifth-communicated request for a physical sample may be of any of a fabric swatch, a wallpaper sample and the like.

As with the display generation method of the present invention, the (7a) 3D image may be of a furnishing that does not yet exist in the real world, and exists only in virtual reality (as designed in three dimensions by a designer). In this case after the fourth-communication of the order, a real copy of the (7a) 3D imaged furnishing which has, until acceptance of the order, never existed save as a virtual image, will be fabricated and delivered.

An analogous, and similar, application of the method of the present invention is to show an exterior space, such as a building or courtyard or yard. Note the slight differences. The model of the space that is uploaded does not define an interior space (a room) in which objects will be placed, but rather an exterior space or scene into which objects will be placed. The dimensions of this exterior space must again be communicated so as to properly show the relative sizes of objects sited in the space. One effective way of communicating information regarding this space is simply to transmit at least two, and potentially many more, plan digital images ("pictures") of the space. At least one distance commonly visible in at least two images is specified. From these images, and with the identification of matching points, the software running in the server computer is able to derive key elements of a 3D model of the exterior space, including its scale.

Yet another analogous, and similar, application of the method of the present invention is to show eyeglasses upon the head of a prospective purchaser. Again note the slight differences. The model of the space that is uploaded does not define an interior space (a room) in which objects will be place, but an exterior scene (a head) upon which objects will be placed. The dimensions of the model scene—the head—are important to show, among other things, the size of the eyeglasses and lenses. One effective way of communicating 3-dimensional information regarding the customer's head from the client computer, as may be for example located in the office of an optometrist, to the server computer in order that a 3D model of the head may be made is simply to use a commercially-available product designed for this purpose. With information provided by such 3-dimensional model capture device, software running in the server computer is able to generate a properly scaled and photographically-textured 3D model of the customer's head, and all pertinent measurements such as, for example, the depth from the bridge of the nose to the ear (as relates to the temple pieces of eyeglass frames).

Still further, the application of the method of the present invention to the selection and imaging of eyeglasses preferably involves specification of both (i) frames and (ii) lenses. The lenses are specified by the optometrist across the communications network to the server computer so that they, as well as the frames, may be alternatively illustrated as made thinner from high index of refraction materials or thicker from low index of refraction materials, of tinted, or beveled, etc. It must be kept in mind that a cheap and comically distorted or unrealistic image is not desired. The computer software used in automated production of the image is, although substantially pre-existing, large and extensive; the computer hardware is powerful; and the accounting for image artifacts—such as reflections and bending of light by the lenses accounted for by ray tracing—extensive. The image generation process is resource intensive, but (i) the extensive resources used to produce the image are shared, and (ii) the image is static. According to these constraints, the image is not produced in real time as might suit, for example, an animated computer game, but is of exceedingly high quality, as suits its purpose.

4. A Method of Interactive Advertising

In still another of its aspects the present invention is embodied in a method of interactive advertising.

The method consists of delivering to a prospective customer of some customer-selected product a virtual image of the product located within virtual scene, the virtual scene permissively including still other virtual objects. This delivering arises from first-interacting upon a digital communications network between (i) a server computer having a first palette of virtual images of scenes, and a second palette of virtual images of products and objects, and (ii) a client computer where the prospective customer selects (1) a scene image from among the server computer's first palette, and also (2) at least one product image, and other object images, from the server computer's second palette. This first-interacting is so as to (i) locate the product, and object, images within the scene image, and also so as to (ii) produce at the server computer to the prospective customer a image of a customer-selected scene in which appears images of a prospective-customer-selected product and other selected objects.

The prospective customer at the client computer thus interacts upon the digital communications network and with the server computer to interactively produce a scene in which the customer-selected-product is advertised.

This method of interactive advertising may be exercised so as to deliver to the prospective customer a virtual image of a furnishing located within a virtual scene of a room, replete with virtual images of other room furnishings. In such a use the prospective customer interacts to produce a scene in which the customer-selected furnishing product is advertised.

This method of interactive advertising may be exercised so as to deliver to the prospective customer a virtual image of a tree, shrub, flower or the like, or a patio or a wall or the like, or shutters or windows or the like, or a barbecue grill, tables, or chairs or the like, located within an outdoor scene, replete with and existing landforms and improvements upon the land. In such a use the prospective customer interacts to produce a scene in which the customer-selected landscaping, and/or natural or man-made artifacts that may be introduced into the scene, are advertised.

Alternatively, the method of interactive advertising may be exercised so as to deliver to a prospective customer a virtual image of some object or objects—clothing or a bicycle or eyeglasses or whatever—located on or near to the body or body parts of the customer. The virtual objects in the image may be accompanied by images of real objects, or virtual body parts and/or body forms. The prospective customer thus interacts to produce a scene in which he or she himself or herself is featured in the scene along with the advertised product.

Alternatively, the method of interactive advertising may be exercised so as to delivering to the prospective customer a virtual image of a vehicle located within a virtual outdoor scene, in accompaniment to virtual images of other vehicles. The prospective customer thus interacts to produce a scene in which the customer-selected vehicle product is advertised.

In any use of the method of interactive advertising, after delivery of the image the method may continue with fulfillment by making a real copy of the displayed customer-selected-product which has, until acceptance of the order, never existed save as a virtual image.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 7 illustrates the interactive advertising method of the present invention by use of a diagram of a perspective view image as may be rendered by the system and method of the present invention, particularly, and by way of example, an interactive automobile advertisement.

DESCRIPTION OF THE PREFERRED EMBODIMENT

Figure 1A:
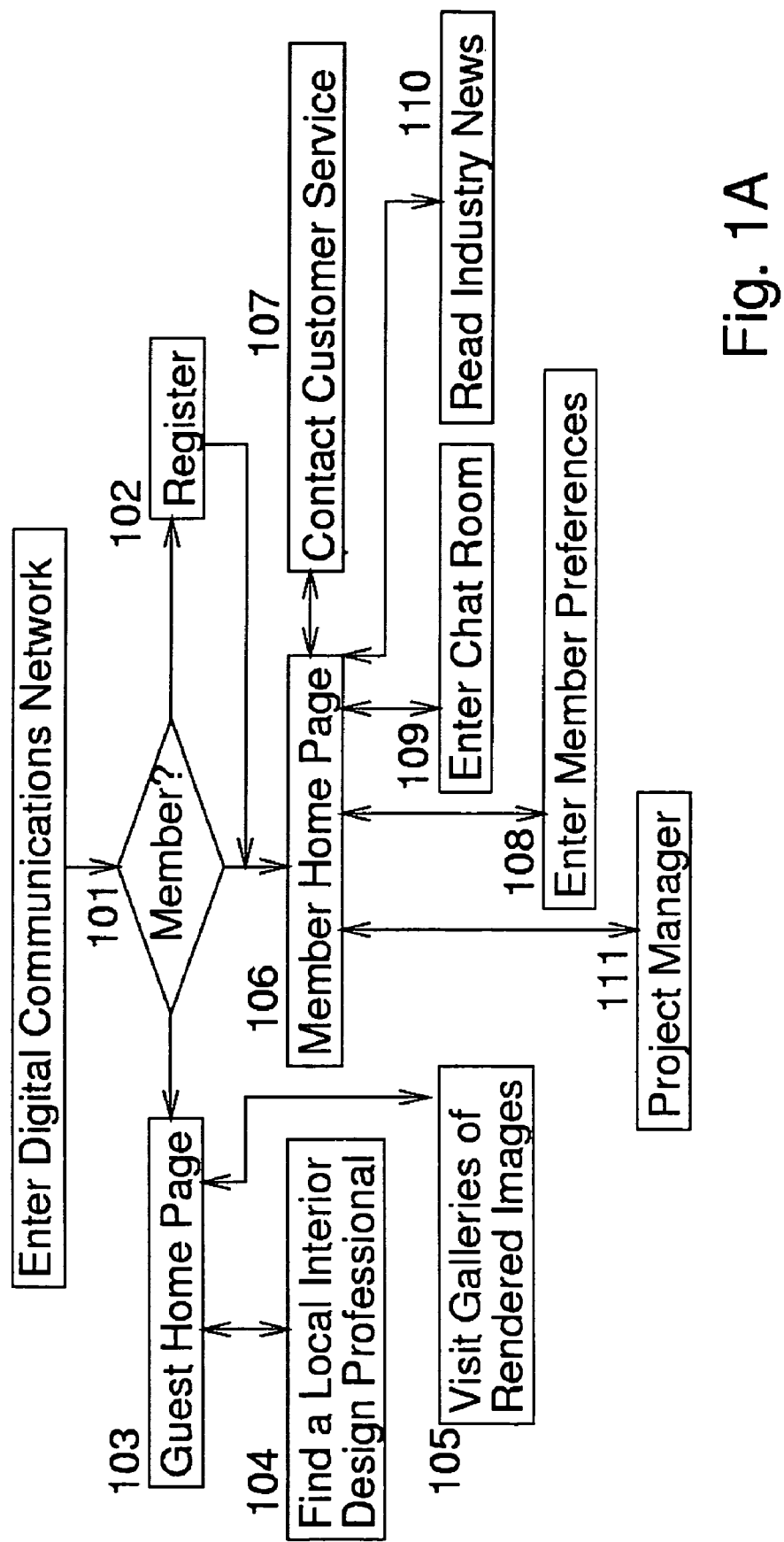
FIG. 1, consisting of FIGS. 1a and 1b, shows a high-level flow chart of the interactive method of a representative embodiment of the present invention for computerized composition and display of perspective images of real or virtual three-dimensional objects located in, surrounding or in front of real or virtual three-dimensional scenes, particularly images of (i) the interior decor of rooms or (ii) eyeglasses upon a prospective customer's head.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Application and Benefits of the Present Invention

In accordance with the present invention, a business based on provision of scene composition services and/or scenes and/or product images is a sort of Internet-accessible computerized graphics service provider. However, it must be emphasized that the preferred business model of the present invention is preferably not based on selling scene composition and imaging services, but rather on providing these valuable and useful services free to legitimate enrolled scene image designers—whether these scene designers are, for example, interior designers or opticians—in order that the objects selected for inclusion in the scene—such as furniture or eyeglass frames—may ultimately be sold, or even made, by the image producer. The image designers benefit from their participation in the interactive scene design in that they are able to better show the products to their customers, concluding sales more rapidly and efficiently with greater customer satisfaction.

The present invention is intended for application in a business-to-business electronic marketplace (e-marketplace). It is primarily directed to interactively promoting products of visually attractive design. Although usable by diverse businesses, the present invention is contemplated to be of greatest value to large multi-store retail chains, and specialized business-to-business e-marketplaces, where products like eyeglasses, or groupings of products like furnishings and art work can be visually selected, customized and evaluated in context The technology of the present invention permits products, such as furnishings in a luxury residence or corporate office, to be manipulated as to rotation and position, and displayed in scenes derived from customer-supplied photographs or CAD sources. Displayed products can then be simply and collectively procured, eliminating the common errors and expense associated with complex multi-manufacturer procurement over phone and facsimile.

1.1 Application and Benefits of the Present Invention to Interior Design

In one embodiment the present invention may be used by interior design professionals. This large wholesale market is ideally suited to web-based intermediation because: 1) both buyers (designers) and sellers (manufacturers and distributors) are fragmented; 2) nearly all mid- to high-end furniture products are highly customized and therefore made-to-order (minimizing the need for inventory); and, 3) given the state of year 2000 digital network infrastructure, the proposed business can only exist on the web, and requires specialized and proprietary visualization technology.

The web-based application and tool of the present invention permits designers and their clients to select, customize and rearrange groupings of furnishings to see how they will look within the client's actual room. The complete system and tool of the present invention includes each of (i) a large on-line catalog containing 2D images and information for textures and furnishings, which may include fabric, wallpaper, paint colors and finishes, wood finishes upholstered furniture, case goods, art, art objects and decorative accessories, (ii) a library of stock 3D room models that may be interactively sized, an interactive 3D room model generator containing a floor plan tool, and (iii) a library of proprietary 3D furnishings models.

By manipulating designer-supplied CAD drawings or photographic images of actual rooms with the software tool of the present invention, designers will be able to simply and quickly produce photo-realistic images of their vision. Features including lighting effects and highly detailed models of furnishings permit the rendered, composite images to appear photo-realistic. While design professionals will occasionally build or render their own models, such projects are very time consuming, and require hours of rendering time on personal computers. The interactive, real-time visualization of an entire room of furnishings, wall and floor coverings, art objects and accessories accorded by the system and method of the present invention is not otherwise, to the best knowledge of the inventors, currently available anywhere (circa 2000).

In use of the system and method of the present invention interior designer and architect members will (1) research, (2) design, (3) render, (4) market, (5) sell and (6) manage.

To (1) research, interior designer and architect members will (i) identify and examine product offerings and customization options; (ii) utilize zoom technology to examine high-resolution product photos in great detail, (iii) utilize a large on-site reference library of searchable room images, (iv) participate in surveys, chat sessions and obtain confidential and anonymous feedback on design ideas; and (v) view industry news and views.

To (2) design, interior designer and architect members will (i) use the powerful web-based graphical user interface and visualization tools of the present invention to virtually decorate interior spaces for residential and some commercial and entertainment applications to professional standards; (ii) create a project color palette, and use it to identify fabrics, rugs, art work, accessories and wood finishes; (iii) select and then view fabrics and finishes at high magnification to see intricate detail by utilizing zoom technology; (iv) apply a large selection of fine fabrics and finishes to intricate 3D models of furniture, pillows and cushions to create a composite image of the room being decorated, all by use of a simple graphical user interface (v) order swatches, and (vi) design and "see" private-label high-end custom cabinets and entertainment centers in various sizes, configurations, styles, veneers and finishes.

To (3) render, interior designer and architect members will (i) specify lighting, camera position and other rendering options; (ii) create photo-realistic renderings of their designs which incorporate photographs or CAD drawings of the actual rooms being decorated; and (iii) order large high-resolution image files or color prints of the photo-realistic renderings produced on the web site of the imaging service provider.

To (4) market, interior designer and architect members will, by use of a password-protected private gallery, showcase renderings of completed projects to prospective clients. A zoom tool will be available here as well, to aid viewers in examining areas of the image they wish to view in greater detail.

To (5) sell, interior designer and architect members will show quality screens and prints of proposed designs to their clients to help these clients "see" how their rooms will look with new furnishings, thereby helping these interior designers and architect members to win client approval to proceed with high-budget projects.

To (6) manage: interior designer and architect members will (i) generate project budgets, track purchase orders, delivery schedules and generate client invoices; (ii) order customized products showcased on the site, including furniture, rugs, wall paper and accessories.

In addition, dealers and manufacturers represented on the web site will be able to test market product designs, gather market data and provide static or interactive advertising to targeted buyers. They will also benefit from the automation inherent in the research, procurement and related systems.

The web site of the imaging service provider will also provide personalized industry community and content. This fully integrated platform will empower interior designers and architects with unprecedented visualization and communication tools, while simultaneously supporting all critical back-office functions. Thus the present invention supports operation of a service business, while outsourcing manufacturing.

It is expected that use of the imaging of the present invention at an associated imaging services web site will significantly improve the productivity of interior design professionals. The imaging services site is intended to be a one stop project management and purchasing system which will improve client communications, and save designers considerable time in identifying sources, selecting and specifying products, developing and communicating designs, obtaining fabric samples, and managing the vendor relationship and procurement process.

1.2 Application and Benefits of the Present Invention to the Display of Art Work In another embodiment the present invention may be used by makers and sellers of fine art. Art work of all kinds, including sculpture, paintings, picture frames, lamps and accessories may usefully be visually evaluated in the context of other furnishings, art work and architecture. This the present invention provides.

1.3 Application and Benefits of the Present Invention to the Selection of Eyeglasses New eyeglasses are difficult for consumers to evaluate, because they may not be available in the showroom in the proper size, color or shape. In addition, most customers can not clearly see the frames when trying them on.

The technology of the present invention permits optical businesses to interactively customize frame designs to augment the shape of their customer's face, skin and hair color, and allow their customers to see how such customized products will look on a computer-generated image of themselves. Such renderings include lens tints and the facial distortion imposed by the customer's actual lens design. Furthermore, profile views permit customers to evaluate the merits of thin high refraction index materials.

The system of the present invention so used excels as a promotional tool. It typically permits expanding the number of frame offerings by an order of magnitude or more, making a limitless virtual display rack available. The present invention will reduce the number of customers who walk out of the shop because they couldn't find a frame that they found attractive. The present invention supports the sale of high-margin tints, optical coatings, high-index and progressive lenses, and a second or third pair of "fancy" glasses designed to complement fashionable clothing. The present invention also stands to reduce distribution and sales costs by (i) eliminating the need for large frame display inventories and (ii) semi-automating the procurement process.

2. General Description of Application of the Present Invention to Interior Decoration The present invention contemplates both (i) a business method of supporting design professionals including manufacturers and representatives, and particularly interior designers and decorators, in the realistic visual display of both real and virtual images of complex three-dimensional objects, particularly wall and floor coverings, art work, lighting fixtures, decor accessories, building products and furniture (herein collectively referred to as "furniture" or "furnishings" in the context of rooms both real and virtual, to the ends of assisting the designer identify, specify and procure products and develop a pleasing design; and of permitting client viewing and endorsement of the interior designs and of rooms themselves as in the case where a home purchase is contemplated, and (ii) an improved three-dimensional image composition, display and procurement system and method, especially as serves to display the decorated rooms of buildings, especially as such furnished room images are created by professional interior designers. The image creation transpires interactively, on a digital communications network.

The visualization method of the present invention is distinguished in that it allows the compositing of precisely-placed, rotated and manipulated (such as, for example, colored or "upholstered") 3D objects of specific size into photographically-derived background scenes at their proper scale over a digital network. Products such as Photo Home Interiors™ also allow the compositing of 3D objects into photographically-derived backgrounds, but not with precise placement, or at the proper scale, or over a digital network. Such images are rendered in 3D and built from 3D objects that are each (i) chosen, (ii) placed, (iii) oriented and (iv) manipulated while in a two dimensional form. This approach is used by programs such as by the Sierra Home Architect 3.0 (a component of Custom Home 3D Design and Decor), for objects projected onto virtually-derived backgrounds. However, this program does not support photographically-derived background scenes—it is basically a CAD program. Choice, placement, orientation and manipulation of the two dimensional images is commonly performed, by way of example, by an interior designer. Although the designer uses his or her skill in each of the selection, three-dimensional placement and orientation, and manipulation of items (typically floor and wall coverings, art work and furniture) in the room, the designer need not be concerned with any three-dimensional, wire frame models of the images, nor with any of the mechanics of rendering the scene of the furnished room in three dimensions. Accordingly, the designer remains such, and is not forced to become a 3D computer graphics engineer to use the system, and the method, of the present invention.

Nonetheless to be assembled with but a modicum of computer graphics skills by using a mouse to point, manipulate and select attributes of simple 2-D images, the 3-D images produced by the present invention are of high quality. Complex 3D objects such as pieces of furniture appear in the room images adjusted in location, size, angular rotation as these objects would actually appear within the 3D volume of an actual room. Even the orientation and scale of fabric coverings, as well as selectable colors, are true to reality. Light ray tracing is preferably performed from actual outdoor and indoor sources of light into, and in, the room. The resulting composite, virtual reality, image is very much like a quality photograph of, typically, a decorated room, and more typically an expensive and elegantly-decorated room as might commonly be within a luxury private home or mansion. Nonetheless that the image looks completely "real", it may show objects, most commonly custom furniture, within rooms that may or may not yet be built, or at least are not yet lighted as within the computer-generated image.

The powerful imaging of the present invention is coupled to the service of a new method of doing business: a method of researching, promoting and procuring products represented by 3D objects (including objects not yet existing) by accurately depicting these objects in the context of their actual sites (background scenes) and actual use. The imaging process is interactive. Most commonly, a professional interior designer (1) will choose, create or provide a two-dimensional (2D) floor plan representation of a room, and (2) will access it across the world wide web along with a proprietary database of two-dimensional images (and invisibly associated 3D models) of furniture, including large amounts of custom furniture that is yet to be fabricated. If provided, the (1) 2D room images may be of (1a) a real room, provided as a set of two or more digital photographs taken from different angles with commonly-identifiable points such that a computer may determine the camera positions and recognize the perspective on, and dimensions of, the room, or (1b) a virtual room, such as can be provided from a CAD/CAM program.

In the (1b) case, the designer provides some simple information about the selected virtual room image, such as the dimensions of the room, the 3D location from which the room is to be viewed (the eye, or camera, location), and the source(s) and type(s) of illumination desired for the rendered room image.

The designer may enhance and customize portions of the rendered room image, such as by virtually hanging 2D pictures or wallpaper, or inserting 2D windows or doors, by making alterations to a 2D representation of the 3D room model, such as a floor plan. Similarly, the designer chooses 2D images of, inter alia, furniture, (i) placing 2D iconic representations of these images into appropriate points within the room with mouse clicks, and then (ii) indicating the desired three-dimensional rotational orientation of the real (3D) items associated with the 2D icons so placed. The designer runs a browser program at a client computer so as to interact across the world wide web with a software program operating on a server to, eventually, produce a 2D composite rendered image of the room.

In greater detail, the designer clicks on an icon, which is most normally a small eye-level front-view picture, of a selected item of, typically, furniture, and then clicks on a desired location within a floor plan or other schematic representation of a room image. This process generates top-view icons that are automatically sized to the scale of the floor plan. Normally only two room coordinates need be specified, the computer knowing from the icon (of a chair, or table, etc.) that the object is to be placed upon the room floor. The designer will preferably indicate the desired rotation of the icon. Again, only one rotational coordinate (relative to a cardinal direction of the room which is normally straight into the viewer screen) of from 0–360° is required because the computer knows from the selected icon that the object is being directionally oriented upon the floor. The end result is a 2D (floor plan) image of a room in which are placed properly sized and oriented 2D (top view iconic) images of furniture. Although the image is rather flat and lifeless—much like paper clothes might be pinned on paper dolls—and a top view iconic image of, for example, a chair oriented to face away from the viewer is most certainly not the same as an image of the back of the chair, the image is useful in evaluating the placement and orientation of the furniture represented by the icons.

Then, in accordance with the present invention, the designer can and will direct that the entire room image, including all contents, be rendered in three dimensions. This 3D image rendering is, in accordance with the present invention, performed by an image graphics program that is most typically run in a powerful computer, and even then most typically over a period of up to several minutes. The resulting image rendering is, however, very useful in supporting the interior design process. Furthermore, because (i) complete and proper dimensional information for the room is provided by the designer/user and is incorporated within the 3D models of the placed objects (the furniture), because (ii) simple rules—such as that furniture should sit upon the floor—are adhered to in the image rendering process, and because (iii) realistic scene illumination is provided by rendering methods such as ray tracing, the rendered 3D image is of high quality, resembling a large color photograph of a completely realistic room.

The designer normally then seeks approval of his or her design vision by having his or her client view this generated image, iteratively making such changes and regenerating the image as proves necessary.

When the interior design of the room is both complete and agreed upon by the interior designer's client, the designer will typically place an order with the image generation service for some or all of the items—most commonly furniture—depicted with the 3D image. The image generation service is thus directly making money for the provider of the service as a wholesaler, manufacturer's representative or jobber, of furnishings and building products like tile or wall paper, or as an agent for artists creating custom furnishings or accessories.

The interior designer may pay a small charge for image rendering services provided, but this charge is typically either de minimis or foregone entirely if and when the designer places orders with the image generation service for the delivery of furniture. In accordance with the present invention, facilitating the sale of furniture is the primary source of revenue to the image generation, promotion and procurement service. The image generation service may also charge furniture manufacturers a nominal fee to create and display images of the manufacturer's furniture—especially if furniture of the manufacturer seldom or never sells—but the primary net revenue derived by the promotion, procurement and image generation service stems from the placing and taking of orders for furniture, and to the lodging of these orders with the manufacturers (if the manufacturer is not an affiliate of the image generation service) for direct or indirect shipment to purchaser. The concept of maintaining profitable relationships with both customers—who desire to buy prudently—and with suppliers—who desire to sell as much as possible—may be compared to the profit model of the modern supermarket chain where revenues are derived from both customers and suppliers (although the furnishings are orders of magnitude more expensive than food).

The present invention still further contemplates interactive advertising. Name, the advertising consists of delivering to a prospective customer of some customer-selected product a virtual image of the product located within virtual scene, the virtual scene permissively including still other virtual objects. In this manner the prospective purchaser of almost anything may view the object of his/her contemplated purchase in the environment of the prospective purchaser's choice.

3. Detailed Description of the Present Invention

Figure 1B:
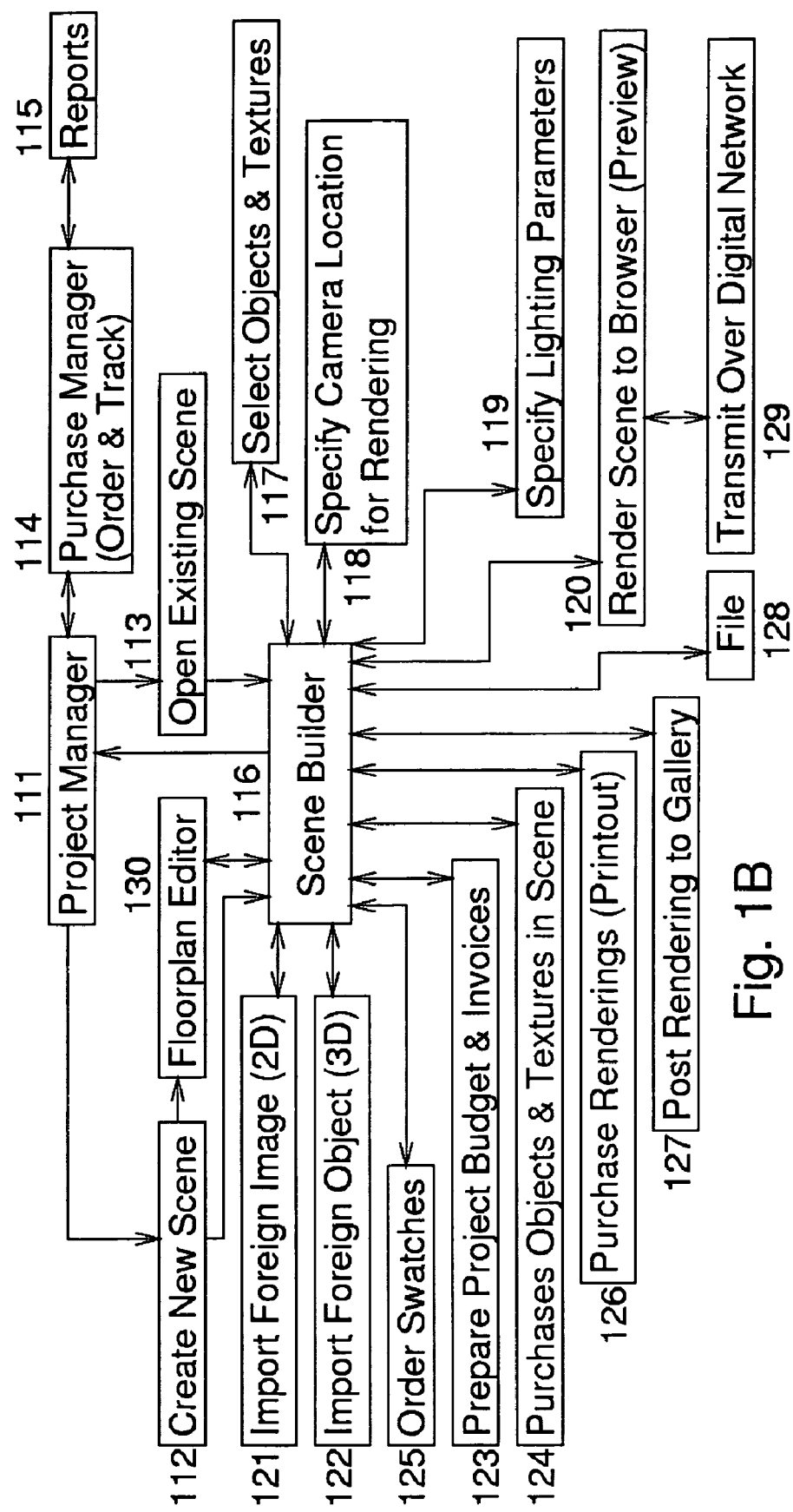

Referring now to the drawings, FIG. 1 is a flow chart illustrating information flow within a preferred embodiment of the present invention. This preferred embodiment is described in reference to an interior decorating system on the Internet. Using a browser, this system permits professional interior designers to support many aspects of their business. These include identifying and selecting furnishings, creating realistic visualizations of furnished rooms, ordering swatches, preparing budgets, ordering furnishings, preparing invoices, tracking orders, staying abreast of industry news, chatting with colleagues, and marketing their services.

Designers will be able to rapidly identify and select furnishings, place them into a floor-plan view of a room model in the desired position along with decorative accessories, wall and floor coverings, and then rapidly render a screen image of the completed room scene, complete with lighting effects. It will also allow new furnishing objects, including furniture upholstered in selected fabrics, wallpaper and carpet to be superimposed with the proper perspective into photographically-derived model images of actual rooms. In this way, a realistic image can be created of an actual room that includes existing furnishings and architectural details, along with new furnishing objects selected by the designer. Such rendered images can then be e-mailed to clients for approval, or large-scale high-resolution color prints can be ordered for use in client discussions.

After selecting furniture objects for inclusion in a particular room, they can be customized, by selecting from many different fabrics and finishes, and by specifying various design detail options. Such unique combinations may never have been built, but the system will nevertheless allow such customized products to be accurately visualized in actual room settings.

As shown in FIG. 1, the process begins with determining membership status 101. In this representative embodiment, membership will only be granted to professional interior designers holding the proper credentials, after they request membership, provide the necessary information, and are accepted or rejected as members 102. Non-member "guests" will have access to only limited portions of the system 103, including a directory of local designers 104, and a public gallery of rendered images 105.

From the Home Page 106, Members will contact customer service 107, enter member preferences 108, enter the chat room 109, read industry news 110, and utilize the Project Manager 111 to create a new room scene 112, open an existing room scene 113, or order and track purchases 114 and print project tracking reports 115.

Figure 2:
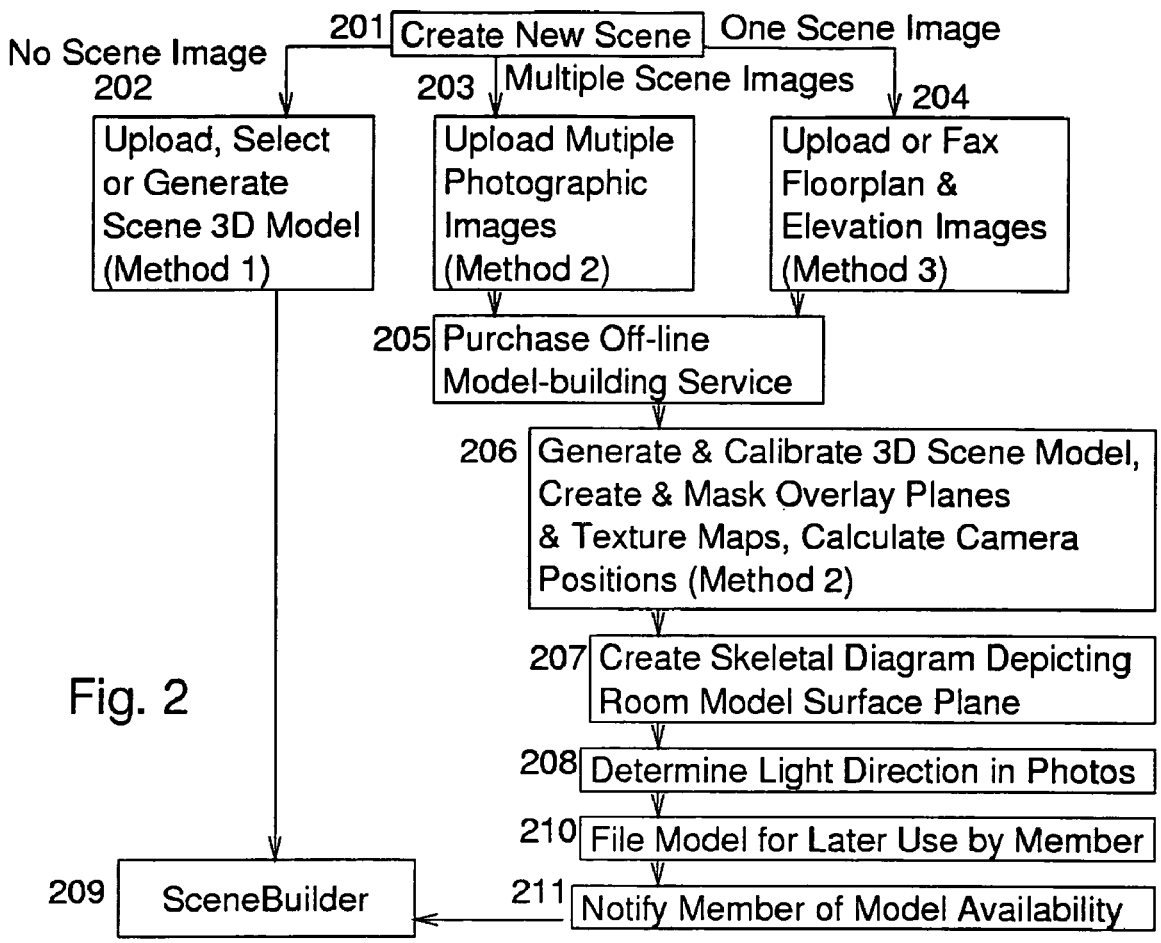
FIG. 2 shows a flow chart expanding certain functions shown within the flow chart of FIG. 1, particularly the uploading and processing of user-supplied digital room images.

As shown in FIG. 2, one of three methods will be utilized for generating a 3D-room model to Create New Scene 201. Method 1 202 involves uploading a 3D model of a room, or selecting such a model from a library of models, or generating such a model using an interactive floor plan layout tool. This tool will be designed to capture both floor plan, elevation and architectural detail information sufficient for the generation of a basic 3D room model of the desired size, shape and height. From here, the user can enter the Scene Builder 209 (described in the earlier reference to 116). Method 2 203 involves multiple digital photographic images of the same room, taken from different camera angles, and the actual distance between two points that appear in two images. Method 3 204 involves uploading a single digital photographic image of a room. Images uploaded under methods 2 and 3 will be processed by a human artist into working 3D models using one or more techniques that will allow the rendering of 3D objects into the room scenes depicted by the digital photograph(s). This model construction process requires the development and calibration of models that have nearly perfect alignment with the designer-supplied photographic image or images. This will require creating not only the room model geometry, but also overlays for all walls, floors and ceilings visible in the room scenes. These will be carefully masked to allow textures like wall paper and carpeting to be accurately rendered on such surfaces without interfering with objects between the camera and the subject surfaces. Such objects, which must be masked, include plants, art work on walls, and existing furniture between the camera and a wall, floor or ceiling.

In the case of Methods 2, the artist will use commercially available software tools to calculate the camera position that was used to take each picture. This will be accomplished in conjunction with creating the background scene models, by mapping like points across multiple images.

In all three methods, other commercially available tools will be utilized to edit the models, create texture maps, and thereby prepare the models for use 206. A skeletal diagram will be created that illustrates each surface plane, allowing the designer to specify textures or colors for each individual plane 207.

In method 2 and 3, the artist will also make a determination of the direction of natural light in the photos 208, for use in rendering the image.

In the case of Method 3, the artist will use commercially-available software tools to build a model of the room 204 from the room image, and dimensions provided by the designer.

Designers may be charged for the development of such room models 205, however, such cost may be refundable with the purchase of furnishings. Such human artist intervention will not be required if the designer chooses Method 1 for loading a room scene. However, Method 1 has its limitations—namely the designer must build or have built a 3D model of the room, or he or she must select a room model from a library of room models, or use the floor plan tool to create one. In addition, such basic models may not fully reflect the design of the actual room being furnished. For example, such "stock" models may lack certain architectural details.

Once these room models are ready for use by the professional designer, they will be filed on a server in the member's designated on-line file for later use 210, and the member will be notified that the model is ready for use 211.

As shown in FIG. 1, once the Member is ready to begin laying out furnishings in the room, he or she will open a room scene model in the Scene Builder 116, and begin searching for images of appropriate furnishings, fabrics and textures, using the system's search tools 117. (Scene Builder is a product name of DecorMagic, Inc., San Diego, Calif.) The scene builder view 116 will contain a floor plan of the room to be furnished, search tools, and thumbnail images of selected furnishings and textures. Clicking on such thumbnails will allow the designer to visualize the object in a larger size on the screen. Further clicking will allow zooming into any part of the image, using proprietary technology, to allow for closer inspection.

Once individual furnishings have been selected for visualization in the room scene, clicking the desired thumbnail and then the floor plan in the desired location will automatically locate a properly scaled iconic representation of the furnishing into the room. Clicking on a selected texture and then on the furnishing icon to which it should be applied will allow the texture to be applied to the subject furnishing. This will allow such textures to be shown running the proper direction, and to scale, on the designated furniture object and with the selected lighting effects once the room image is rendered. Any furniture icon may be rotated about its vertical axis to the desired angle by simply clicking on one of the dots that will appear like a halo around each icon. Room surface textures like wall paper and carpet, or wall paint color (collectively referred to herein as textures) can be selected and applied in a similar manner, by clicking on the texture, and then on any wall, ceiling or floor area designated on a 3D perspective skeletal model of the room. Such skeletal model images will clearly designate individual wall, ceiling floor surfaces that are represented by overlay planes in the associated 3D room model. All such textures will be initially displayed on the associated icon, wall (in the case of wall paper) or floor (in the case of carpets). Ceiling color or texture will be selected for use by clicking on a texture and then on the appropriate area of the 3D perspective skeletal model, but the ceiling will not be visible in the Scene Builder until the image is rendered, as the Scene Builder will not display the ceiling. Selected wall color or wall paper will be applied to each wall surface by first clicking on the texture and then clicking the desired wall segment in the skeletal model.

Next, the designer will specify on the floor plan the location of any windows that should be the source of lighting in the completed rendering. All such windows will be designated by clicking a window icon, specifying the dimensions, and then clicking the location of such window on the perimeter of floor plan, unless they are already part of a 3D model.

Then, in the case of Method 1, the designer will select the desired camera position for rendering 118. This will be accomplished by clicking the camera icon, and then clicking the desired camera location on the floor plan. Camera height can be specified as well, by entering it in the appropriate screen field. However, if the room model was photographically-derived (constructed from two or more photographic images), then the designer will specify which actual camera position to use for a particular rendering. Multiple renderings, from different actual or virtual camera positions can also be requested, included close-up views of individual furniture groupings or areas of the full image. Room lighting parameters can also be specified 119. The method of so specifying, which permits the rendered image to project similar lighting and shadows on the virtual objects, may be, by way of example, that method more fully described in the proceedings from Siggraph 2000, Course 16, at page 354. The room scene is now complete and ready for rendering. By clicking the rendering button 120, this process is initiated. In this manner, an accurate and high-quality image of a professionally decorated existing or to-be-built room can be rendered to guide an iterative design process and to help a professional designer communicate design concepts to his or her client and for procurement.

Finally, foreign objects (like images of art work), may be imported 121/122; budgets and invoices may be prepared and printed 123, and furnishings may be ordered 124. This system will also allow swatches 125 and high-resolution prints of the rendered images to be ordered in various sizes 126, and the rendered images to be posted to a public or private virtual gallery 127. In addition, it will be possible for rendered images to be saved in user files 128, on the server, and e-mailed or otherwise transmitted 129 to third-parties on the network for review or approval.

Normally, the rendering of complex 3D images can take hours (circa 2000) of computing time. The present invention contemplates dividing the rendered image into a number of sub-images before rendering begins, such that each sub-image can be rendered in parallel on a separate computer (massively parallel processing). Once the individual sub-images have been rendered, they will be reassembled for presentation to the designer on his Internet browser. By this mechanism, or some other computing mechanism that achieves a similar result, the rendered image should be available for viewing very quickly—possibly in less than one minute. Changes can then be made in the location of objects or the camera, the selection of finishes, etc., and the rendering process repeated until the designer is satisfied with the design.

Figure 3:
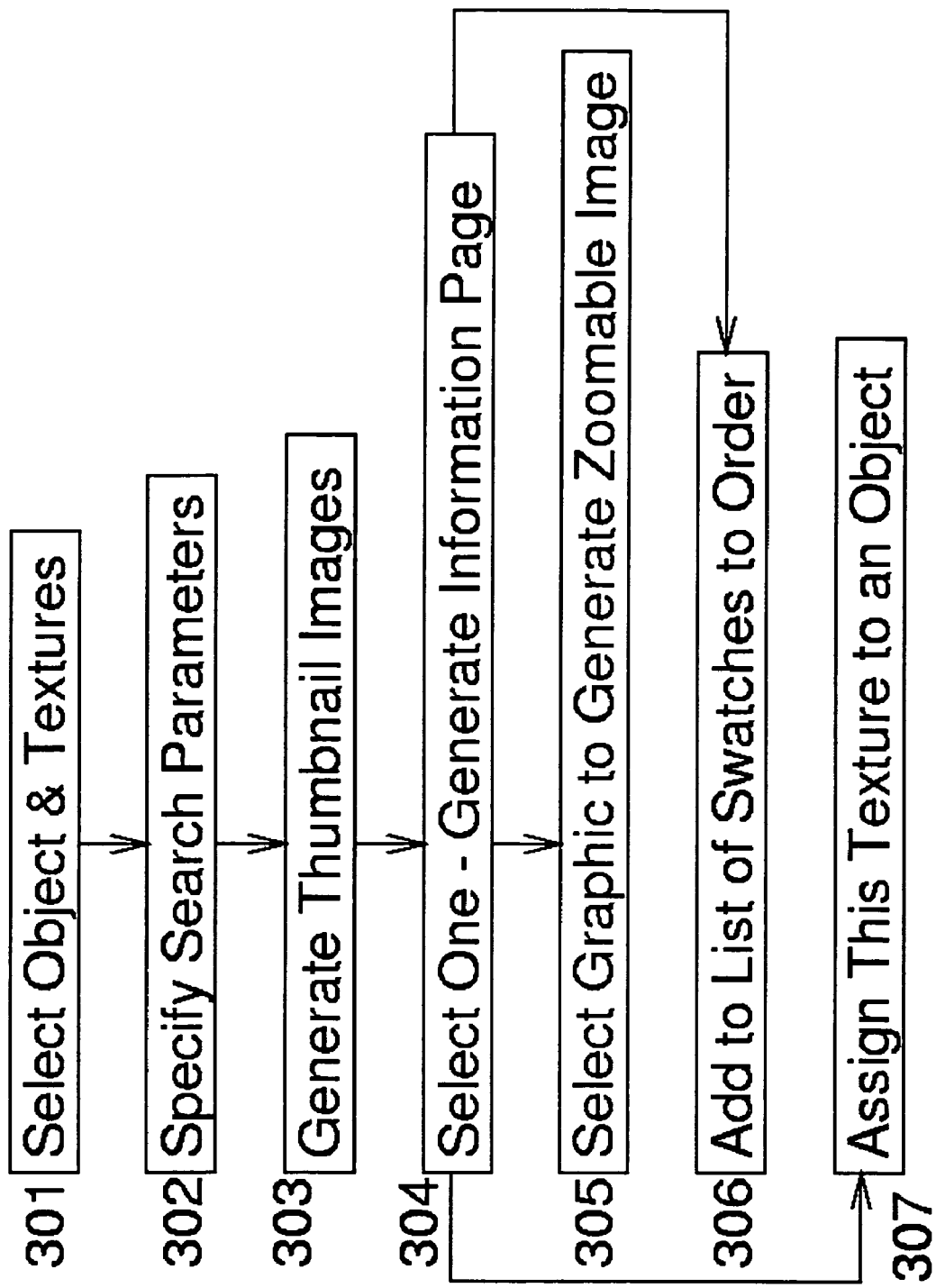
FIG. 3 shows a flow chart expanding the functions related to selecting objects and textures.

FIG. 3 illustrates some of the details associated with the process of selecting objects and textures 301. First, search parameters are specified in 302. Based upon these parameters, objects or textures that match the specified parameters are displayed as thumbnail images 303. The designer then selects one such thumbnail image, and the associated information page, which includes text as well as graphical information about the object or texture is displayed 304. The graphical information can then be inspected more closely by zooming into any area, repeatedly, to view greater and greater detail for smaller and smaller sections of the image 305. Then, in the case of textures, if the designer wishes to order a swatch of the selected material, he/she can do so by clicking a check-box, and add this material to the list of swatches to order 306. From 304, the designer can also elect to assign this texture to a specific object 307.

Figure 4:
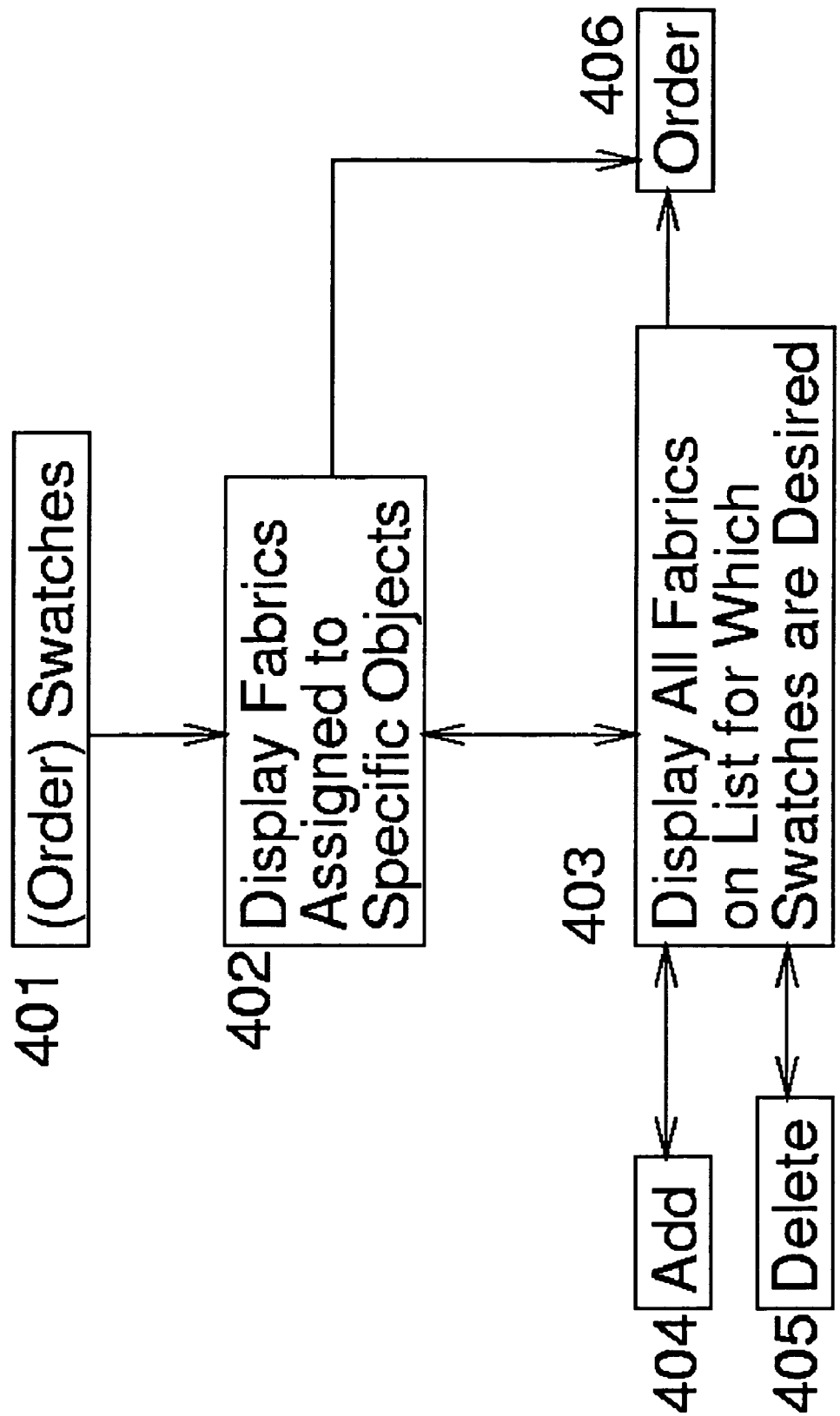
FIG. 4 shows a flow chart expanding the functions related to ordering swatches.

FIG. 4 illustrates the method by which swatches can be ordered, once the desired materials are specified 401. The list of fabrics assigned to specific objects can be displayed 402. This list can be replaced with a list 403 of all fabrics the designer has selected (in 306). The designer can add to 404 or delete from 405 fabrics in this list. From either 402 or 403, the designer can place an order to have all the swatches on the list 406.

Figure 5:
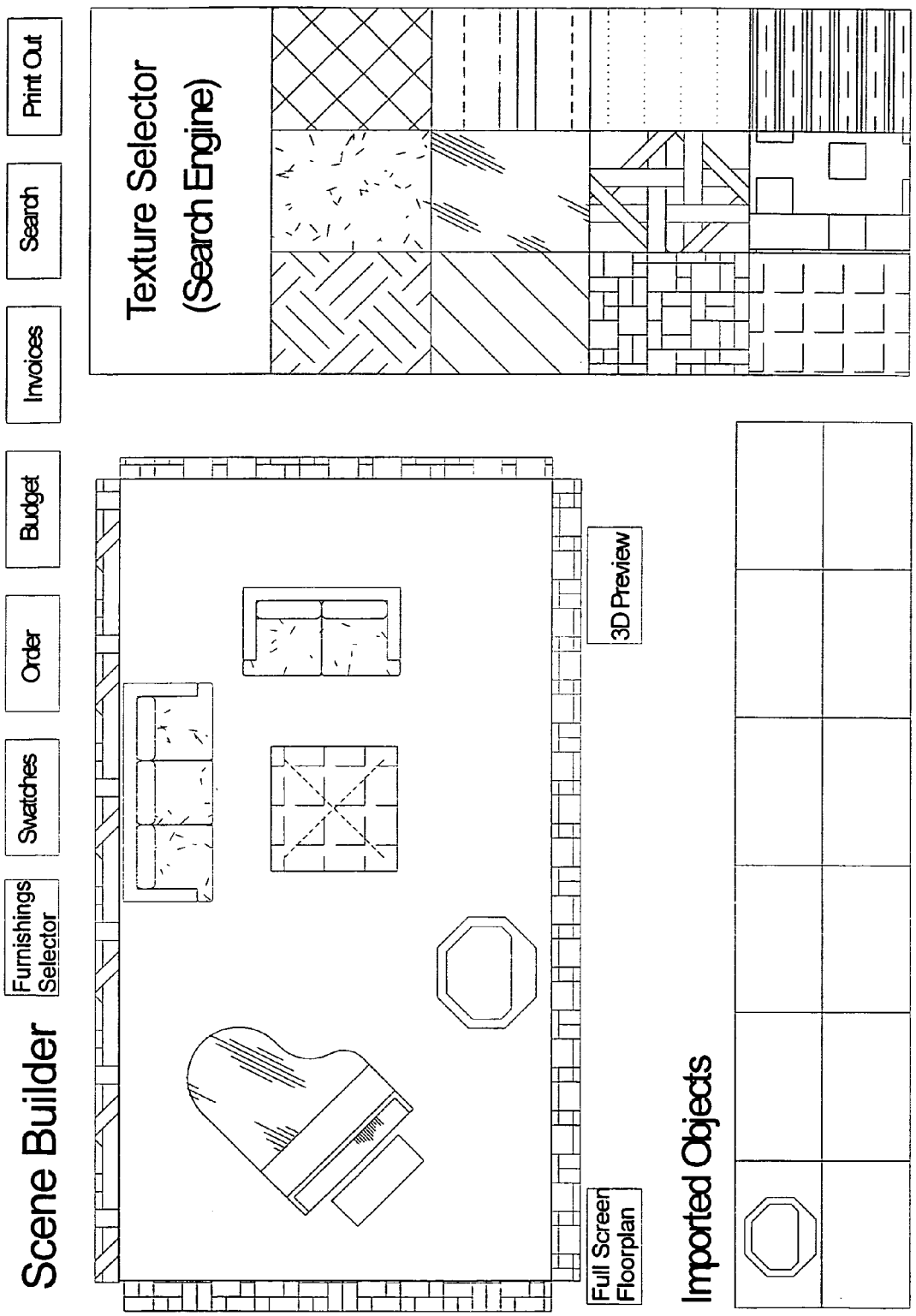
FIG. 5 is a diagram of a screen view, and associated selectable control functions, presented to a viewer/operator, most typically an interior designer, by the system and method of the present invention, particularly including an example browser screen view used to specify furniture objects and their locations.
Figure 6:
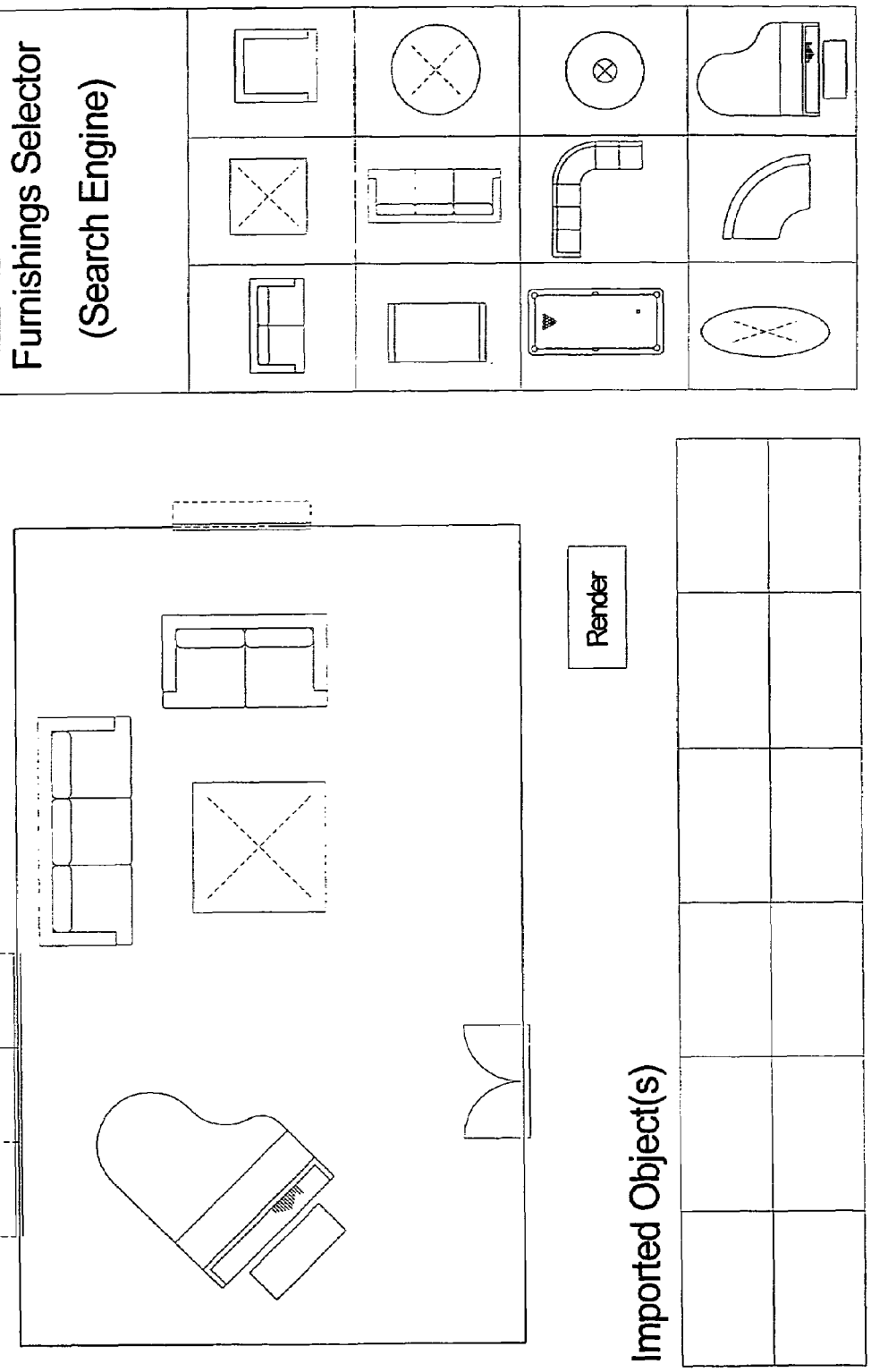
FIG. 6 is a diagram of a screen view which is a continued from the view of FIG. 5.

FIG. 5 shows an example browser screen representing the Scene Builder, which continues on FIG. 6. The Furnishing Selector, Texture Selector, thumbnail images retrieved by these selectors, the floor plan into which iconic representations of furnishing objects are placed and rotated on their vertical axes, and various buttons to accomplish tasks are illustrated.

The principals of the present invention should not be regarded as being limited solely to interior design. FIG. 7 illustrates how it supports a novel form of interactive advertising. A prospective customer is able to place a properly scaled image of a luxury automobile into an image of his/her driveway to examine it for contextual compatibility. The prospective customer would be able to virtually customize the car, adding accessories like special wheels, or changing the color or model, to see how the customized automobile would look against the background scene of his or her residence.

4. Adaptations, Extensions, and Variations

In accordance with the preceding explanation, variations and adaptations of the (1) interior decor composition and display, (2) advertising, and (3) fulfillment systems and methods of the present invention will suggest themselves to practitioners of the (1) digital computer imaging, (2) advertising, and (3) e-commerce arts.

For example, the (1) composition and display could be of architect-designed additions to a residence. For example, the (2) advertising could be of resort apparel, illustrated on the prospective purchaser at the actual resort to be visited. For example, (3) designers without showrooms, or even any such capital as would permit their creations to be fabricated in advance of purchase, could display their designs of expensive and/or extensive and/or physically large pieces in situ, thereby showing the products of their imaginations in virtual reality.

In accordance with these and other possible variations and adaptations of the present invention, the scope of the invention should be determined in accordance only with the following claims, and not solely in accordance with that embodiment within which the invention has been taught.

What is claimed is:

1. A computerized method of generating and rendering over a digital communications network a perspective view image of an object that can exist in the real world located within, surrounding, or in front of, a three-dimensional scene that can also exist in the real world, the method of presenting a perspective view image of an object in a 3D scene comprising:

producing at a first computer upon a digital communications network
  (1a) a 3D model of the background, or, equivalently,
  (1b) precursors of the 3D background model, or, equivalently, (1c) one or more related 2D views of the background scene suitable to serve as precursors of the 3D background model,
  (2) for (1b) and (1c) associated dimensional information of the particular 3D scene, and
  (3) a selected suitably-real-world object positioned and oriented in the background scene; and
transmitting from the first computer upon the digital communications network the information (1)–(3);
receiving at another, second, computer upon the digital communications network the information (1)–(3);
deriving in the second computer if not transmitted from the first computer (4) a 3D background model of the represented and selected 3D background scene; and utilizing in the second computer the information (1)–(3) and the (4) derived 3D background scene model to generate and render in consideration of (5) a camera location and orientation, and object-based rules as to how the selected object exists within the 3D scene, (6) a perspective view image of the selected object in the 3D scene; and then transmitting from the second computer upon the digital communications network the (6) perspective view image; and receiving at the first computer upon the digital communications network this (6) perspective view image; and displaying at the first computer this (6) perspective view image;

wherein the object, having an associated geometry, is rendered in proper (1) scale, (2) position and (3) rotation within the perspective view image;

wherein the entire computer-generated perspective view image is rendered and viewed with the same proper perspective that a conventional photo of the same scene would exhibit, if captured by a camera; and wherein object selection, placement and orientation in the scene made interactively over a digital network supports the generation of a perspective view image having proper perspective showing an object located and oriented within a 3D scene.

2. The method according to claim 1
exercised to the purpose that a prospective purchaser of the suitably-real-world object may be rendered a proper perspective view image of an object that is virtual located within the suitably-real-world 3D scene,
wherein if the object and/or the scene shown in the perspective view image do not actually exist, either or both object and scene could so exist.

3. The method according to claim 1
wherein the (3) suitably-real-world object is selected in the form of a 2D iconic image, the 2D iconic image representing an associated selected suitably-real-world object.

4. The method according to claim 3
wherein the 2D iconic image is electively placed and rotated at the first computer to produce (3a) placement and rotational information regarding where and at what positional attitude the selected object is to be placed within the selected 3D scene; and
wherein the combining in the second computer of the information (1)–(3) and the (4) derived 3D background scene model to assemble in consideration of (5) object-based rules as to how the selected object exists within the 3D scene, is further in consideration of the (3a) placement and rotational information, to produce (6) the perspective view image of the selected object properly scaled, located and oriented relative to the 3D scene.

5. The method according to claim 1
wherein the producing at the first computer is further of (3a) a 3D model of the selected suitably-real-world object that is itself either 2D or 3D; and
wherein the utilizing in the second computer is further of the (3a) 3D model of the selected suitably real-world 3D object to produce the (6) perspective view image;
wherein the model of the selected suitably-real-world 2D or 3D object originates at the first computer.

6. The method according to claim 1
wherein the utilizing is further in consideration of (5a) scene lighting.

7. The method according to claim 1
wherein the utilizing in the second computer is further of a (4a) a 3D model of the selected suitably real-world 3D object that is itself either 2D or 3D to produce the (6) perspective view image;
wherein the 3D model of the selected suitably-real-world object originates at the second computer.

8. The method according to claim 6
wherein the model originated at the second computer is of an object for sale.

9. The method according to claim 1
wherein the producing at the first computer is further of (3a) placement and rotational information regarding where and at what positional attitude the selected object is to be placed within the selected 3D scene; and
wherein the utilizing in the second computer of the information (1)–(3) and the (4) derived 3D background scene model to assemble in consideration of (5) object-based rules as to how the selected object exists within the 3D scene, is further in consideration of the (3a) placement and rotational information, to produce (6) the perspective view image of the selected object properly scaled, located and oriented relative to the 3D scene;
wherein the placement and rotation information originates at the first computer.

10. The method according to claim 9
wherein the placement and rotation information originating at the first computer concerns location and attitude of furnishings or architectural components or improvements within the 3D scene.

11. The method according to claim 1
wherein the combining in the second computer of the information (1)–(3) and the (4) derived 3D background scene model is further of (4a) placement and rotational information in order to generate in consideration of (5) object-based rules as to how the selected object exists within the 3D scene, and so as to produce (6) the perspective view image, having a perspective that is proper and accurate in camera location, orientation and lens focal length, of the selected object properly scaled, located and oriented relative to the 3D scene;
wherein the placement and rotation information originates at the second computer.

12. The method according to claim 1
wherein the suitably-real-world object is a 2D object drawn from the group consisting of wall coverings including paint and wallpaper, and floor coverings including carpet and tile.

13. A computerized method of generating and rendering over a digital communications network a perspective view image of an object that can exist in the real world located within a three-dimensional space that can also exist in the real world, the method of presenting a perspective view image of an object in a 3D space comprising:
generating at a client computer upon a digital communications network
(I) one or more images representing an associated particular suitably-real-world 3D scene in which 3D scene a suitably-real-world object can exist,
(ii) associated dimensional information of the particular 3D scene as appears within a particular image,
(iii) a selected 2D iconic image representing an associated selected suitably-real-world object, and
(iv) placement and rotational information regarding where and at what positional attitude the selected object represented by the selected iconic image is to be placed within the selected scene;

transmitting from the first computer upon the digital communications network the information (I)–(iv);

receiving at another, second, computer upon the digital communications network the information (I)–(iv);

utilizing in the second computer this information (I)–(iv) with
- (v) a photographically or virtually derived 3D model of the represented and selected 3D scene,
- (vi) a 3D model of the selected object that is represented by the selected 2D iconic image, and
- (vii) object-based rules as to how the object exists within the 3D scene, in order to generate in this second computer
- (viii) a 3D perspective view image of the object in proper perspective; and then transmitting from the second computer upon the digital communications network the (viii) perspective view image; and receiving at the first computer upon the digital communications network this (viii) perspective view image; and displaying at the first computer this (viii) perspective view image;

wherein, given a particular 3D scene, selection of an iconic image with which is associated a selected 3D model, and location of the object within the 3D scene, permits generation of a perspective view image of the selected suitably-real-world object in proper perspective within the selected suitably-real-world 3D scene;

wherein image selection made interactively over a digital network transpiring entirely in 2D supports the generation of a perspective view image of proper perspective showing an object located and oriented within a 3D scene.

14. The method according to claim 13 exercised to the purpose that a prospective purchaser of the suitably-real-world object may be rendered a perspective view image of an object that is virtual within the suitably-real-world 3D scene, wherein if the object and/or the scene shown in the perspective view image do not actually exist, either or both object and scene could so exist.

15. The method according to claim 14 wherein the utilizing is of (I) a particular image representing a room, and (iii) a selected 2D icon representing a room furnishing or architectural component or improvement, with (v) a 3D model of the room, (vi) a 3D model of the furnishing or architectural component or improvement, and (vii) object-based rules to the effect that the furnishing or architectural component or improvement is upon a floor, a wall or a ceiling of the room, in order to generate (viii) a perspective view image of the room furnishing or architectural component or improvement properly located and oriented within the room;

wherein a prospective purchaser of the real-world room furnishing or architectural component or improvement may be rendered a perspective view image of a suitably-real-world room furnishing or architectural component or improvement properly located and oriented within a real-world room.

16. The method according to claim 15 wherein the suitably-real-world room furnishing or architectural component or improvement rendered in perspective view image already exists in the world, and can be ordered by the prospective purchaser.

17. The method according to claim 15 wherein the suitably-real-world room furnishing or architectural component or improvement rendered in perspective view image does not yet exist in the world, and must be built when ordered by the prospective purchaser.

18. The method according to claim 14 wherein the utilizing is of (I) a particular image representing a human head, and (iii) a selected 2D icon representing eyeglasses, with (v) a 3D model of the human head, (vi) a 3D model of the eyeglasses, and (vii) object-based rules to the effect that temple pieces of the eyeglasses slip over ears of the human head that is the subject of the 3D model while each lens of the eyeglasses is centered in front of an eye of the human head, in order to generate (viii) a perspective view image of the eyeglasses properly located and oriented upon and fitted to the human head;

wherein a prospective purchaser of the real-world eyeglasses may be rendered a perspective view image of the eyeglasses properly located and oriented upon, and fitted to, the purchaser's own human head.

19. The method according to claim 18 wherein the suitably-real-world eyeglasses rendered in perspective view image already exist in the world, and can be ordered by the prospective purchaser.

20. The method according to claim 15 wherein the suitably-real-world room eyeglasses rendered in perspective view image do not yet exist in the world, and must be built when ordered by the prospective purchaser.

21. The method according to claim 13 performed interactively between a server computer and a client computer upon a digital communications network, the method further comprising:

communicating from the server computer upon a digital communications network to a client a plurality of 2D iconic images of suitably-real-world objects;

selecting at the client computer (iii) a selected 2D iconic image from among the plurality of images as does correspond to a selected suitably-real-world object;

sizing and placing at the client computer the selected icon within the selected real-world 2D scene image;

communicating from a client computer to the server computer upon a digital communications network (I) a 2D image of a suitably-real-world scene, and (iii) the sized and placed selected 2D iconic image within the selected suitably-real-world 2D scene image;

generating, at the server computer from (v) a 3D model of the selected suitably-real-world space and (vi) the 3D model of the suitably-real-world object and the object-based rules, a (viii) perspective view image of the suitably-real-world object properly located and oriented within the selected suitably-real-world space, the perspective view image being proper in each of scene lighting, camera location and orientation, and camera lens parameters; and communicating from the server computer upon the digital communications network (viii) the generated perspective view image to the client computer; and displaying at the client computer (viii) the generated perspective view image;

wherein from (viii) this perspective view image the suitably-real-world object properly located and oriented within the suitably-real-world space may be observed, and may be so observed in a perspective view image that is proper in each of scene lighting, camera location and orientation, and camera lens parameters.

22. An interactive method of promoting and selling real-world objects comprising:
originating at a server upon a digital communications network
(1) a first plurality of 2D images depicting real-world 3D scenes,
(2) a second plurality of 2D images depicting real-world 3D objects,
(3) a third plurality of 2D icons corresponding to the second plurality of 2D images depicting real-world 3D objects,
(4) a fourth plurality of 3D models corresponding to those 3D spaces that are depicted within the first plurality of 2D images,
(5) a fifth plurality of 3D models corresponding to the 3D objects that are depicted within the second plurality of 2D images, and
(6) a sixth plurality of object-based rules;
first communicating from the server upon a digital communications network to a client the (1) first plurality of 2D images of real-world 3D spaces, the (2) second plurality of 2D images of real-world 3D objects, and the (3) third plurality of 2D icons corresponding to the second plurality of 2D images of real-world 3D objects;
selecting at the client a (1a) selected real-world 2D scene image from among the (1) first plurality of 2D images, and a (3a) selected 2D icon from among the (3) third plurality of 2D icons which (3a) selected 2D icon does correspond to a (2a) selected 2D object image from among the (2) second plurality of 2D object images;
sizing and placing at the client the (3a) selected 2D icon within the (1a) selected real-world 2D scene image;
second communicating from the client upon the digital communications network to the server the sized and placed (3a) selected 2D icon within the (1a) selected real-world 2D scene image;
selecting at the server from among the (4) fourth plurality of 3D models a (4a) 3D model of the real-world space corresponding to the (1a) selected real-world 2D scene image, and from the (5) fifth plurality of 3D models a (5a) 3D model of the real-world 3D object;
generating at the server from the (4a) 3D model of the real-world space, the (5a) 3D model of the real-world object and the (6) plurality of object-based rules, a (7) static perspective view image of a (7a) 3D real-world object corresponding to the (3a) selected icon properly located and oriented relative to a (7b) 3D real-world space corresponding to the (1a) selected real-world 2D scene image, this static perspective view image being proper in each of scene lighting, camera location and orientation, and camera lens parameters; and
third communicating from the server upon the digital communications network to the client the generated (7) static perspective view image;
wherein from this third-communicated (7) static perspective view image the (7a) 3D real-world object properly located and oriented relative to the (7b) 3D real-world space may be observed at the client; and
fourth communicating from the client upon the digital communications network to the server a sales order to physically provide a real specimen of the (7a) 3D real-world object;
wherein obtaining the sales order for the (7a) 3D real-world object is promoted by the (7) static perspective view image showing at the client the (7a) 3D real-world object properly located and oriented relative to the (7b) 3D real-world space.

23. The interactive method for selling real-world objects according to claim 22 exercised for the purpose of selling furnishings or architectural components or improvements wherein
the originating at a server is of (1) a first plurality of 2D images depicting rooms, (2) a second plurality of 2D images depicting furnishings or architectural components or improvements, (3) a third plurality of icons corresponding to the second plurality of furnishing or architectural component or improvement images, (4) a fourth plurality of 3D models corresponding to the rooms that are depicted within first plurality of 2D room images, (5) a fifth plurality of 3D models corresponding to the furnishings or architectural components or improvements that are depicted within second plurality of 2D furnishing or architectural component or improvement images, and (6) a sixth plurality of rules regarding how furnishings or architectural components or improvements fit within rooms;
the first communicating from the server upon a digital communications network to the client is of (1) the first plurality of 2D room images, (2) the second plurality of 2D furnishing or architectural component or improvement images, and (3) the third plurality of furnishings or architectural components or improvements icons;
the selecting at the client is of a (1a) selected real-world 2D room image from among the (1) first plurality of room images, and
(3a) a selected furnishing or architectural component or improvement icon from among the (3) third plurality of furnishing or architectural component or improvement icons, which (3a) selected furnishing or architectural component or improvement icon does correspond to (2a) a selected furnishing or architectural component or improvement image from among the (2) second plurality of furnishing or architectural component or improvement images;
the sizing and placing at the client is of the (3a) selected furnishing or architectural component or improvement icon within the (1a) selected 2D room image;
the second communicating from the client upon the digital communications network to the server is of the sized and placed (3a) selected furnishing or architectural component or improvement icon within the (1a) selected 2D room image;
the selecting at the server from among the (4) fourth plurality of 3D models is of a (4a) 3D model of the room corresponding to the (1a) selected 2D room image, and from the (5) fifth plurality of 3D models a (5a) 3D model of the furnishing or architectural component or improvement corresponding to the (3a) selected furnishing or architectural component or improvement icon;
the generating at the server from the (4a) 3D room model, the (5a) 3D furnishing or architectural component or improvement model and the (6) plurality of furnishing or architectural component or improvement rules, is of a (7) static perspective view image of a (7a) 3D furnishing or architectural component or improvement corresponding to the (3a) selected furnishing or architectural component or improvement icon properly located and oriented within a (7b) 3D room corresponding to the (1a) selected 2D room image; and the third communicating from the server upon the digital communications network to the client is of the generated (7) static perspective view image;

wherein from this third-communicated (7) static perspective view image the (7a) 3D furnishing or architectural component or improvement properly located and oriented within the (7b) 3D room may be observed at the client; and the fourth communicating from the client upon the digital communications network to the server is of a sales order to physically provide a real specimen of the (7a) 3D furnishing or architectural component or improvement;

wherein obtaining the sales order for the (7a) 3D furnishing or architectural component or improvement is promoted by the (7) static perspective view image showing at the client the (7a) 3D furnishing or architectural component or improvement properly located and oriented within the (7b) 3D room.

24. The interactive method for selling furnishings or architectural components or improvements according to claim 22 wherein at least one of the server's first, second, third and fifth pluralities is proprietary.

25. The interactive method for selling furnishings or architectural components or improvements according to claim 24 wherein all of the server's first, second, third and fifth pluralities are proprietary.

26. The interactive method for selling furnishings or architectural components or improvements according to claim 24 further comprising:

wherein the originating at a server is further of (8) a set of available lighting effects;

wherein the first communicating from the server upon a digital communications network to the client is further of the (8) set of available lighting effects;

wherein the selecting at the client is further of a (8a) selected lighting effect from among the (8) set of lighting effects;

wherein the second communicating from the client upon the digital communications network to the server is further of the (8a) selected lighting effect;

wherein the generating at the server is further of the (7) static perspective view image as illuminated by the (8a) selected lighting effect; and wherein the third communicating from the server upon the digital communications network to the client is of the generated (7) static perspective view image as illuminated by the (8a) selected lighting effect.

27. The interactive method for selling furnishings or architectural components or improvements according to claim 26 wherein the selecting is performed by an interior designer at the client.

28. The interactive method for selling furnishings or architectural components or improvements according to claim 24 further comprising:

wherein the originating at a server is further of (9) a set of available textures and colors;

wherein the first communicating from the server upon a digital communications network to the client is further of the (9) set of available textures and colors;

wherein the selecting at the client is further of a (9a) selected textures and colors from among the (9) set of textures and colors;

wherein the second communicating from the client upon the digital communications network to the server is further of the (9a) selected textures and colors;

wherein the generating at the server is further of the (7) static perspective view image as textured and colored by the (8a) selected textures and colors; and wherein the third communicating from the server upon the digital communications network to the client is of the generated (7) static perspective view image as textured and colored by the (8a) selected textures and colors.

29. The interactive method for selling furnishings or architectural components or improvements according to claim 28 wherein the selecting is performed by an interior designer at the client.

30. The furnishings or architectural components or improvements sales method according to claim 28 wherein the image generation system produces a 2D virtual image of the room where all textures are scaled and oriented to the three-dimensional objects in which the textures appear.

31. The interactive method for selling furnishings or architectural components or improvements according to claim 24 wherein the selecting is performed by an interior designer at the client.

32. The interactive method for selling furnishings or architectural components or improvements according to claim 30 that, between the third communicating and the fourth communicating, further comprises:

fifth communicating upon the digital communications network from a person who is an interior designer located at the client to the server a request for a real physical sample of something in the generated and displayed 3D image of the room with furnishings or architectural components or improvements; and physically providing the requested sample to the interior designer for physical inspection outside of the displayed perspective view image.

33. The interactive method for selling furnishings or architectural components or improvements according to claim 32 wherein the fifth communicating is of a request for a fabric or carpet swatch; and wherein the physically providing is of the requested swatch.

34. The interactive method for selling furnishings or architectural components or improvements according to claim 32 wherein the fifth communicating is of a request for a paint or stain color sample; and wherein the physically providing is of the requested paint or stain color sample.

35. The interactive method for selling furnishings or architectural components or improvements according to claim 32 wherein the fifth communicating is of a request for a wallpaper sample; and wherein the physically providing is of the requested wallpaper sample.

36. The interactive method for selling furnishings or architectural components or improvements according to claim 32 that, after the fourth communicating, further comprises:

making a real product in accordance with the image depicted by the (7a) 3D furnishing or architectural component or improvement model, which product has, until acceptance of the order and the making, never existed in the real world, and has only been represented as a virtual image.

37. An interactive method of promoting and selling real-world objects comprising:
   originating at a server upon a digital communications network
      (1) a first plurality of 2D images depicting real-world 3D scenes,
      (2) a second plurality of 2D images depicting real-world 3D objects,
      (3) a third plurality of 2D icons corresponding to the second plurality of 2D images depicting real-world 3D objects,
      (4) a fourth plurality of 3D models corresponding to the 3D scenes that are depicted within first plurality of 2D images of real-world 3D spaces,
      (5) a fifth plurality of 3D models corresponding to the 3D objects that are depicted within a second plurality of 2D images of real-world 3D objects, and
      (6) a sixth plurality of object-based rules;
   first communicating from the server upon a digital communications network to a client the (1) first plurality of 2D images of a real-world 3D space, the (2) second plurality of 2D images of real-world 3D objects, and the (3) third plurality of 2D icons corresponding to the second plurality of 2D images of real-world 3D objects;
   selecting at the client a (1a) selected real-world 2D scene image from among the (1) first plurality of 2D scene images, and a (3a) selected 2D icon from among the (3) third plurality of 2D icons which (3a) selected 2D icon does correspond to a (2a) selected 2D object image from among the (2) second plurality of 2D object images;
   sizing and placing at the client the (3a) selected 2D icon within the (1a) selected real-world 2D scene image;
   second communicating from the client upon the digital communications network to the server the sized and placed (3a) selected 2D icon within the (1a) selected real-world 2D scene image;
   selecting at the server from among the (4) fourth plurality of 3D models a (4a) 3D model of the real-world scene corresponding to the (1a) selected real-world 2D scene image, and from the (5) fifth plurality of 3D models a (5a) 3D model of the real-world 3D object;
   generating at the server from the (4a) 3D model of the real-world space, the (5a) 3D model of the real-world object, and the (6) plurality of object-based rules, a (7) perspective view image of a (7a) 3D real-world object corresponding to the (3a) selected icon properly located and oriented within a (7b) 3D real-world scene corresponding to the (1a) selected real-world 2D scene image, this static perspective view image being proper and accurate and internally consistent in each of scene lighting, camera location and orientation, and camera lens parameters; and
   third communicating from the server upon the digital communications network to the client the generated (7) perspective view image;
   wherein from this third-communicated (7) perspective view image the (7a) 3D real-world object properly located and oriented within the (7b) 3D real-world scene may be observed at the client; and
   fourth communicating from the client upon the digital communications network to the server a sales order to physically provide a real specimen of the (7a) 3D real-world object;
   wherein obtaining the sales order for the (7a) 3D real-world object is promoted by the (7) perspective view image showing at the client the (7a) 3D real-world object properly located and oriented within the (7b) 3D real-world scene.

38. The interactive method for selling real-world objects according to claim 37 exercised for the purpose of selling furnishings or architectural components or improvements wherein
   the originating at a server is of (1) a first plurality of 2D images depicting rooms, (2) a second plurality of 2D images depicting furnishings or architectural components or improvements, (3) a third plurality of icons corresponding to the second plurality of furnishing images, (4) a fourth plurality of 3D models corresponding to the rooms that are depicted within first plurality of 2D room images, (5) a fifth plurality of 3D models corresponding to the furnishings or architectural components or improvements that are depicted within second plurality of 2D furnishing or architectural component or improvement images, and (6) a sixth plurality of rules regarding how furnishings or architectural components or improvements fit within rooms;
   the first communicating from the server upon a digital communications network to the client is of (1) the first plurality of 2D room images, (2) the second plurality of 2D furnishing images, and (3) the third plurality of furnishings or architectural components or improvements icons;
   the selecting at the client is of a (1a) selected real-world 2D room image from among the (1) first plurality of room images, and
   (3a) a selected furnishing or architectural component or improvement icon from among the (3) third plurality of furnishing or architectural component or improvement icons, which (3a) selected furnishing or architectural component or improvement icon does correspond to (2a) a selected furnishing or architectural component or improvement image from among the (2) second plurality of furnishing or architectural component or improvement images;
   the sizing and placing at the client is of the (3a) selected furnishing or architectural component or improvement icon within the (1a) selected 2D room image;
   the second communicating from the client upon the digital communications network to the server is of the sized and placed (3a) selected furnishing or architectural component or improvement icon within the (1a) selected 2D room image;
   the selecting at the server from among the (4) fourth plurality of 3D models is of a (4a) 3D model of the room corresponding to the (1a) selected 2D room image, and from the (5) fifth plurality of 3D models a (5a) 3D model of the furnishing or architectural component or improvement corresponding to the (3a) selected furnishing or architectural component or improvement icon;
   the generating at the server from the (4a) 3D room model, the (5a) 3D furnishing or architectural component or improvement model and the (6) plurality of furnishing or architectural component or improvement rules, is of a (7) static perspective view image of a (7a) 3D furnishing or architectural component or improvement corresponding to the (3a) selected furnishing or architectural component or improvement icon properly located and oriented within a (7b) 3D room corresponding to the (1a) selected 2D room image; and
   the third communicating from the server upon the digital communications network to the client is of the generated (7) static perspective view image;
   wherein from this third-communicated (7) static perspective view image the (7a) 3D furnishing or architectural component or improvement properly located and oriented within the (7b) 3D room may be observed at the client; and the fourth communicating from the client upon the digital communications network to the server is of a sales order to physically provide a real specimen of the (7a) 3D furnishing or architectural component or improvement;

wherein obtaining the sales order for the (7a) 3D furnishing or architectural component or improvement is promoted by the (7) static perspective view image showing at the client the (7a) 3D furnishing or architectural component or improvement properly located and oriented within the (7b) 3D room.

39. The interactive method for selling furnishings or architectural components or improvements according to claim 37 wherein at least one of the server's first, second, third and fifth pluralities is proprietary.

40. The interactive method for selling furnishings or architectural components or improvements according to claim 39
wherein all of the server's first, second, third and fifth pluralities are proprietary.

41. The interactive method for selling furnishings or architectural components or improvements according to claim 39 further comprising:
wherein the originating at a server is further of (8) a set of available lighting effects including realistic lighting and shadows;
wherein the first communicating from the server upon a digital communications network to the client is further of the (8) set of available lighting effects;
wherein the selecting at the client is further of a (8a) selected lighting effect from among the (8) set of lighting effects;
wherein the second communicating from the client upon the digital communications network to the server is further of the (8a) selected lighting effect;
wherein the generating at the server is further of the (7) static perspective view image as illuminated by the (8a) selected lighting effect; and
wherein the third communicating from the server upon the digital communications network to the client is of the generated (7) static perspective view image as illuminated by the (8a) selected lighting effect.

42. The interactive method for selling furnishings or architectural components or improvements according to claim 41
wherein the selecting is performed by an interior designer at the client.

43. The interactive method for selling furnishings or architectural components or improvements according to claim 39 further comprising:
wherein the originating at a server is further of (9) a set of available textures and colors;
wherein the first communicating from the server upon a digital communications network to the client is further of the (9) set of available textures and colors;
wherein the selecting at the client is further of a (9a) selected textures and colors from among the (9) set of textures and colors;
wherein the second communicating from the client upon the digital communications network to the server is further of the (9a) selected textures and colors;
wherein the generating at the server is further of the (7) static perspective view image as textured and colored by the (8a) selected textures and colors; and wherein the third communicating from the server upon the digital communications network to the client is of the generated (7) static perspective view image as textured and colored by the (8a) selected textures and colors.

44. The interactive method for selling furnishings or architectural components or improvements according to claim 43
wherein the selecting is performed by an interior designer at the client.

45. The furnishings or architectural components or improvements sales method according to claim 43
wherein the image generation system produces a 2D virtual image of the room where all textures are scaled and oriented to the three-dimensional objects in which the textures appear.

46. The interactive method for selling furnishings or architectural components or improvements according to claim 39
wherein the selecting is performed by an interior designer at the client.

47. The interactive method for selling furnishings or architectural components or improvements according to claim 45 that, between the third communicating and the fourth communicating, further comprises:
fifth communicating upon the digital communications network from the interior designer at the client to the server a request for a real physical sample of something in the generated and displayed 3D image of the room with furnishings or architectural components or improvements; and
physically providing the requested sample to the interior designer.

48. The interactive method for selling furnishings or architectural components or improvements according to claim 47
wherein the fifth communicating is of a request for a fabric or carpet swatch; and
wherein the physically providing is of the requested swatch.

49. The interactive method for selling furnishings or architectural components or improvements according to claim 47
wherein the fifth communicating is of a request for a paint or stain color sample; and
wherein the physically providing is of the requested paint or stain color sample.

50. The interactive method for selling furnishings or architectural components or improvements according to claim 47
wherein the fifth communicating is of a request for a wallpaper sample; and
wherein the physically providing is of the requested wallpaper sample.

51. The interactive method for selling furnishings or architectural components or improvements according to claim 39 that, after the fourth communicating, further comprises:
making a real product in accordance with the image depicted by the (7a) 3D furnishing or architectural component or improvement model, which product has, until acceptance of the order and the making, never existed in the real world, and has only been represented as a virtual image.

* * * * *